(12) United States Patent
Ayaz et al.

(10) Patent No.: US 11,432,206 B2
(45) Date of Patent: Aug. 30, 2022

(54) NETWORK ENTITY AND MOBILE COMMUNICATION DEVICE FOR PROVIDING COMMUNICATION SERVICES BASED ON GEOGRAPHICAL CODES

(71) Applicant: Huawei Technologies Co., Ltd., Shenzhen (CN)

(72) Inventors: Serkan Ayaz, Munich (DE); Alexandros Kaloxylos, Munich (DE); Panagiotis Spapis, Munich (DE); Chan Zhou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/399,135

(22) Filed: Apr. 30, 2019

(65) Prior Publication Data

US 2019/0261226 A1 Aug. 22, 2019

Related U.S. Application Data

(63) Continuation of application No. PCT/EP2016/076229, filed on Oct. 31, 2016.

(51) Int. Cl.
*H04W 36/00* (2009.01)
*H04L 12/18* (2006.01)
(Continued)

(52) U.S. Cl.
CPC ..... *H04W 36/0016* (2013.01); *H04L 12/1886* (2013.01); *H04W 4/02* (2013.01);
(Continued)

(58) Field of Classification Search
CPC ... H04W 36/0016; H04W 4/02; H04W 80/02; H04W 4/20; H04W 4/80; H04W 36/0007;
(Continued)

(56) References Cited

U.S. PATENT DOCUMENTS 9,319,851 B2 4/2016 Yu et al.
2016/0285935 A1* 9/2016 Wu ........................ G08G 1/161
(Continued)

FOREIGN PATENT DOCUMENTS

CN 104618067 A 5/2015
CN 104780619 A 7/2015
(Continued)

OTHER PUBLICATIONS

"Discussion on multi-cell multicast/broadcast enhancements for V2V communication," 3GPP TSG RAN WG1 Meeting #84bis, Busan, Korea, R1-162374, XP051080153, 3rd Generation Partnership Project, Valbonne, France (Apr. 2016).
(Continued)

*Primary Examiner* — Jackie Zuniga Abad
(74) *Attorney, Agent, or Firm* — Leydig, Voit & Mayer, Ltd.

(57) ABSTRACT

The present disclosure relates to a network entity for a communication network for providing a plurality of communication services to a plurality of mobile communication devices, the network entity comprising: a session manager configured to select a first geographical code from a plurality of geographical codes, wherein each geographical code is associated with a geographical region and wherein the first geographical code is associated with a first geographical region including or close to a current geographical position of at least one of the plurality of mobile communication devices; a encoder configured to encode on a MAC level and/or physical level at least a portion of a message intended for the at least one mobile communication device using the first geographical code; and a communication interface configured to send the message with the portion encoded with the first geographical code to the at least one mobile communication device.

13 Claims, 25 Drawing Sheets

(51) Int. Cl.
H04W 8/08 (2009.01)
H04W 60/04 (2009.01)
H04W 4/02 (2018.01)
H04W 80/02 (2009.01)
H04W 4/20 (2018.01)
H04W 4/80 (2018.01)

(52) U.S. Cl.
CPC .............. *H04W 4/20* (2013.01); *H04W 4/80* (2018.02); *H04W 8/08* (2013.01); *H04W 36/0007* (2018.08); *H04W 60/04* (2013.01); *H04W 80/02* (2013.01)

(58) Field of Classification Search
CPC ......... H04W 8/08; H04W 60/04; H04W 4/12; H04L 12/1886
See application file for complete search history.

(56) References Cited

U.S. PATENT DOCUMENTS

2018/0049073 A1\* 2/2018 Dinan ............... H04W 72/1263
2019/0174271 A1\* 6/2019 Fujishiro ............... H04W 4/023
2019/0335348 A1\* 10/2019 Hou ...................... H04W 24/10

FOREIGN PATENT DOCUMENTS

CN 105575155 A 5/2016
WO 2014164353 A2 10/2014
WO 2016122589 A1 8/2016

OTHER PUBLICATIONS

"Signaling Details for eNB Controlled Sidelink V2V Communication," 3GPP TSG RAN WG1 Meeting #84bis, Busan, Korea, R1-162364, XP051080143, 3rd Generation Partnership Project, Valbonne, France (Apr. 2016).
"Discussion on the eMBMS based V2X broadcast," 3GPP TSG RAN #93bis, Dubrovnik, Croatia, R2-162397, XP051082082, 3rd Generation Partnership Project, Valbonne, France (Apr. 2016).
"3rd Generation Partnership Project; Technical Specification Group Radio Access Network; Study on LTE-based V2X Services;(Release 14)," 3GPP TR 36.885 V14.0.0, pp. 1-216, 3rd Generation Partnership Project, Valbonne, France (Jun. 2016).
"3rd Generation Partnership Project; Technical Specification Group Services and System Aspects; Study on LTE support for Vehicle to Everything (V2X) services(Release 14)," 3GPP TR 22.885 V14.0.0, pp. 1-50, 3rd Generation Partnership Project, Valbonne, France (Dec. 2015).
"5G Automotive Vision," Ertico Its Europe, European Comission, 5GPPP, pp. 1-67, (Oct. 20, 2015).
"Taxonomy and Definitions for Terms Related to On-Road Motor Vehicle Automated Driving Systems," J3016, SAE International, pp. 1-12 (Jan. 2014).
"MBMS latency and capacity analysis for V2X," 3GPP TSG-RAN WG2 #92, Anaheim, USA, pp. 1-13, 3rd Generation Partnership Project, Valbonne, France (Nov. 16-20, 2015).
"Potential enhancement for MBMS Control Plane latency reduction," 3GPP TSG-RAN WG2 #94, Nanjing, China, R2-164073, pp. 1-6, 3rd Generation Partnership Project, Valbonne, France (May 23-27, 2016).
"3rd Generation Partnership Project; Technical Specification Group Services and System Aspects; Architecture enhancements for V2X services (Release 14)," 3GPP TS 23.285 V14.0.0, pp. 1-28, 3rd Generation Partnership Project, Valbonne, France (Sep. 2016).
"Transmit different V2X messages in different broadcast areas," 3GPP TSG-RAN3 Meeting #92, Nanjing, China, R3-161 174, pp. 1-4, 3rd Generation Partnership Project, Valbonne, France (May 23-27, 2016).
"Localized eMBMS architecture for V2X," SA WG2 Meeting #115, Nanjing, P.R. China, S2-162414, pp. 1-5, (May 23-27, 2016).
Festag, "Geocasting over 11p, LTE and beyond," 4th ETSI TC ITS Workshop, Doha, Qatar, pp. 1-11 (Feb. 7-9, 2012).
"Intelligent Transport Systems (ITS); Vehicular Communications; Geographical Area Definition," ETSI EN 302 931 V1.0.0, pp. 1-11, European Telecommunications Standards Institute (Dec. 2010).
"LTE Quick Reference," Retrieved from http://www.sharetechnote.com/html/Handbook_LTE_RNTI.html, Retrieved on May 29, 2019, pp. 1-10.
"3rd Generation Partnership Project; Technical Specification Group Radio Access Network; Evolved Universal Terrestrial Radio Access Network(E-UTRAN); General aspects and principles for interfaces supporting Multimedia Broadcast Multicast Service (MBMS) within E-UTRAN (Release 13)," 3GPP TS 36.440 V13.0.0, pp. 1-12, 3rd Generation Partnership Project, Valbonne, France (Dec. 2015).
"3rd Generation Partnership Project; Technical Specification Group Services and System Aspects; Multimedia Broadcast/Multicast Service (MBMS);Protocols and codecs(Release 14)," 3GPP TS 26.346 V14.0.0, pp. 1-240, 3rd Generation Partnership Project, Valbonne, France (Sep. 2016).
"3rd Generation Partnership Project; Technical Specification Group Radio Access Network; Evolved Universal Terrestrial Radio Access (E-UTRA); Medium Access Control (MAC) protocol specification(Release 14)," 3GPP TS 36.321 V14.0.0, pp. 1-96, 3rd Generation Partnership Project, Valbonne, France (Sep. 2016).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14)," 3GPP TS 36.300 V14.0.0, pp. 1-314, 3rd Generation Partnership Project, Valbonne, France (Sep. 2016).
"3rd Generation Partnership Project; Technical Specification Group Services and System Aspects; Multimedia Broadcast/Multicast Service (MBMS); Protocols and codecs (Release 13)," 3GPP TS 26.346 V13.5.0, total 237 pages, 3rd Generation Partnership Project, Valbonne, France (Jun. 2016).
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321 V13.2.0, total 91 pages, 3rd Generation Partnership Project, Valbonne, France (Jun. 2016).

\* cited by examiner

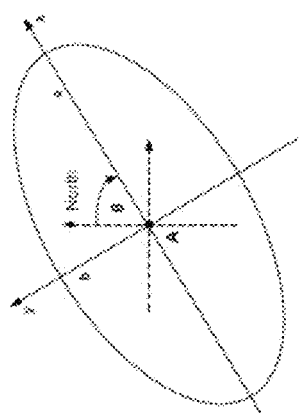
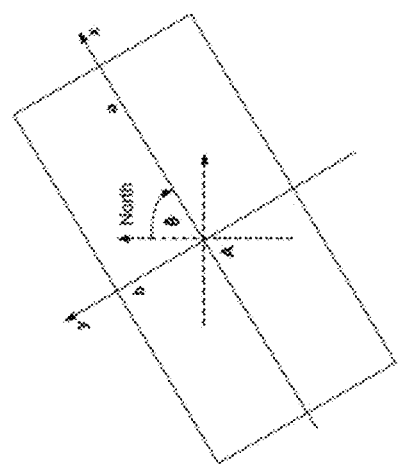
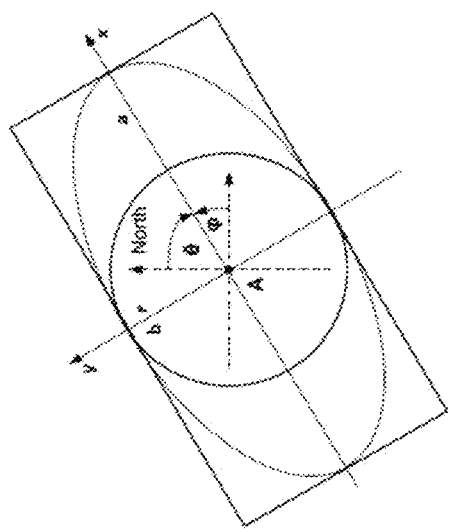
Fig. 4

TMGI ⟷ Geo-RNTI Mapping Table

| Geo-RNTI / TMGI Mapping | Cooperative Collision Avoidance (CCA) | Lane Merging (LM) |
|---|---|---|
| Region 1 | Geo-RNTI1→N/A | Geo-RNTI2→N/A |
| Region 2 | Geo-RNTI3→N/A | Geo-RNTI4→N/A |
| Region 3 | Geo-RNTI5→N/A | Geo-RNTI6→N/A |

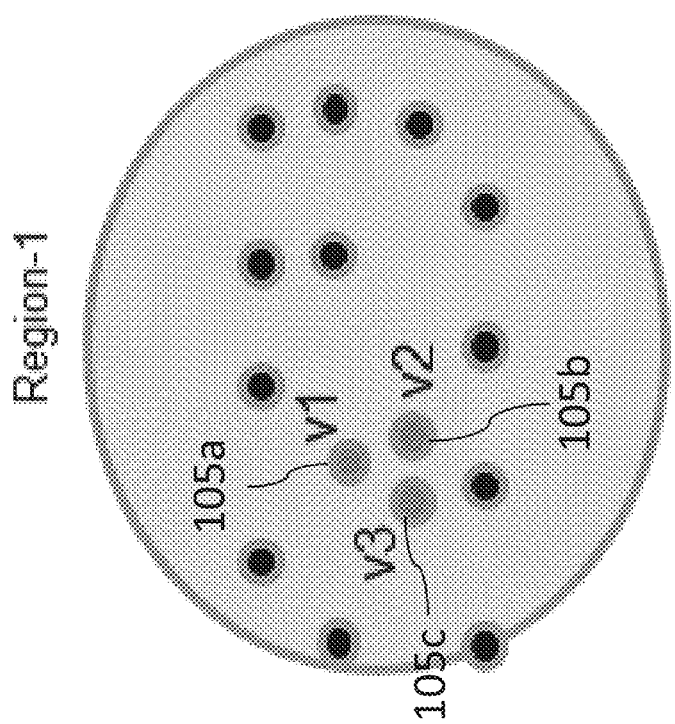

| TMGI / Geo-RNTI Mapping | Cooperative Collision Avoidance (CCA) | Lane Merging (LM) |
|---|---|---|
| Region 1 | Geo-RNTI1 → TMGI1 | Geo-RNTI2 → TMGI2 |
| Region 1 | Geo-RNTI1 → TMGI3 | Geo-RNTI2 → TMGI4 |
| Region 2 | Geo-RNTI3 → TMGI5 | Geo-RNTI4 → TMGI6 |
| Region 2 | Geo-RNTI3 → TMGI7 | Geo-RNTI4 → TMGI8 |
| Region 3 | Geo-RNTI5 → TMGI9 | Geo-RNTI6 → TMGI10 |
| Region 3 | Geo-RNTI5 → TMGI11 | Geo-RNTI6 → TMGI12 |

TMGI ↔ Geo-RNTI Mapping Table (BS1)

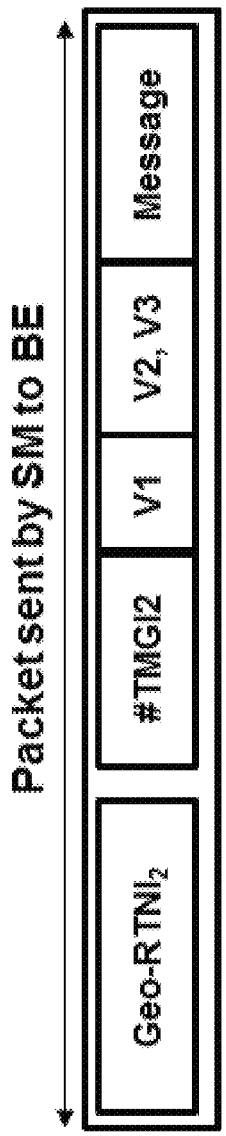

NETWORK ENTITY AND MOBILE COMMUNICATION DEVICE FOR PROVIDING COMMUNICATION SERVICES BASED ON GEOGRAPHICAL CODES

CROSS-REFERENCE TO RELATED APPLICATIONS

This application is a continuation of International Application No. PCT/EP2016/076229, filed on Oct. 31, 2016, the disclosure of which is hereby incorporated by reference in its entirety.

TECHNICAL FIELD

Generally, the present disclosure relates to wireless communications. More specifically, the disclosure relates to a network entity for providing communication services to a mobile communication device as well as such a mobile communication device.

BACKGROUND

The third generation partnership project (3GPP) is in the process of enhancing Long Term Evolution (LTE) specifications towards 5G, which focuses, on the one hand, on enhancements of mobile broadband features and, on the other hand, on new solutions for different vertical industries, in particular for support of V2X (vehicle-to-everything) services. Currently two type of radio interfaces are considered for V2X services, namely sidelink (PC5) and UL/DL (Uu) (see, for instance, 3GPP TR 36.885 V14.0.0 (2016-06), Study on LTE-based V2X Services).

In 3GPP, V2X services can be grouped into two different types. The first type of services are basic intelligent transport services (ITS), e.g., cooperative awareness message (CAM) and decentralized environmental notification message (DENM), which should satisfy the requirements defined in Release 14, 3GPP TR 22.885 V2.0.0 (2015-12), Study on LTE support for V2X services, including a maximum delay of 100 ms for the most types of services.

The second type of V2X services is more challenging in terms of delay and reliability and solutions for these services are standardized in release 15 and further in 3GPP. Also these services can be grouped mainly into two groups, namely cooperative perception services (e.g., exchange of sensor data to increase the local limited sensor horizon) and cooperative maneuvering services (collaborative decision making) (e.g., 5G-PPP, 5G Automotive Vision, Oct. 20, 2015). These services are also known as SAE level 4 and 5 in the automotive domain (see, for instance, SAE, J3016 Taxonomy and Definitions for Terms Related to On-Road Motor Vehicle Automated Driving Systems, S A E, 2014) and require very low latency (e.g., of the order of a few milliseconds) as well as very high reliability (e.g., 99.999%).

In 3GPP, multimedia broadcast multicast service (MBMS) and single-cell point-to-multipoint (SC-PTM) are the state-of-the art technologies that are standardized in release 8 and release 13, respectively. In particular, these technologies are based on certain architecture components, such as a broadcast/multicast service center (BM-SC), a MBMS-gateway, and a multi-cell multicast coordination entity (MCE) collocated with an evolved-UTRAN (E-UTRAN). In particular, internet protocol (IP) is one main component of this architecture, where a MBMS-gateway performs IP multicast transmissions. In 3GPP, this architecture is mainly designed for services like IP-TV or other type of entertainment services. However, this kind of architecture does not satisfy the delay requirements of the second phase services described above (e.g., cooperative perception, cooperative maneuvering, SAE level 4 and 5). In fact, the streaming data is distributed from the core network to the access network, which causes an unsatisfying delay performance. Since the end-to-end delay should be guaranteed to be less than a few milliseconds, communication among vehicles should be fully localized. In particular, the delay analysis can be grouped into two parts: measured delay during regular operation (regular operation means the transmitting user equipment (UE) is in connected mode and the receivers are also capable of receiving multicast/broadcast data under the same or neighboring base station (BS)), wherein typical backhaul latencies are around 20 ms (see, for instance, 3GPP TR 36.885 V14.0.0 (2016-06), Study on LTE-based V2X Services and R2-156861 and Ericsson, 3GPP RAN WG2) and measured delay in case anyone of the receivers perform handover due to mobility, wherein the total average delay in SC-PTM is around 100 ms (e.g., see R2-164073, 3GPP RAN WG2).

Thus, there is a need for a devices and methods for a wireless communication network, which allow reducing latency and/or signaling overhead in the wireless communication network.

SUMMARY

It is an object to provide devices and methods for a wireless communication network, which allow reducing latency and/or signaling overhead in the wireless communication network.

The foregoing and other objects are achieved by the subject matter of the independent claims. Further implementation forms are apparent from the dependent claims, the description and the figures.

According to a first aspect, the disclosure relates to network entity for a communication network for providing a plurality of communication services to a plurality of mobile communication devices. The network entity comprises a session manager configured to select a first geographical code from a plurality of geographical codes, wherein each geographical code can be associated with a geographical region and wherein the first geographical code is associated with a first geographical region including or close to a current geographical position of at least one of the plurality of mobile communication devices. Further the network entity comprises an encoder configured to encode, in particular on a MAC level or on a physical level, at least a portion of a message intended for the at least one mobile communication device using the first geographical code, and a communication interface configured to send the message with the portion encoded with the first geographical code to the at least one mobile communication device.

In a first possible implementation form of the network entity according to the first aspect as such, the session manager is further configured to select a second geographical code from the plurality of geographical codes, wherein the second geographical code is associated with a second geographical region including or close to the current geographical position of the at least one mobile communication device, but different to the first geographical region associated with the first geographical code, and wherein the encoder is further configured to encode on a MAC level or a physical level at least a portion of the message intended for the at least one mobile communication device using the second geographical code, wherein the communication interface is further configured to send the message with the portion encoded with the second geographical code to the at least one mobile communication device.

In a second possible implementation form of network entity according to the first aspect as such or the first implementation form thereof, the session manager is further configured to provide the at least one mobile communication device via the communication interface with the plurality of geographical codes in response to an attach procedure, a location update procedure, a handover procedure or another service request message of the at least one mobile communication device.

In a third possible implementation form of network entity according to the second implementation form of the first aspect, the session manager is configured to provide the at least one mobile communication device a subset of the plurality of geographical codes, wherein the session manager is configured to select the subset of the plurality of geographical codes on the basis of information about a current and/or a future trajectory of the at least one mobile communication device.

In a fourth possible implementation form of network entity according to the first aspect as such or any one of the first to third implementation form thereof, the communication network defines a plurality of communication cells, wherein each communication cell is associated with a base station of the communication network and wherein the geographical region is defined by a portion of a communication cell.

In a fifth possible implementation form of network entity according to the first aspect as such or any one of the first to fourth implementation form thereof, at least one mobile communication device comprises a first group of mobile communication devices and the session manager is further configured to include a first group identifier, in particular a temporary mobile group identity (TMGI), in the message with the portion encoded with the first geographical code, wherein the first group identifier is assigned to the first group of mobile communication devices and/or a communication service associated therewith.

In a sixth possible implementation form of network entity according to the fifth implementation form of the first aspect, the session manager is further configured to maintain a mapping between the plurality of geographical codes and a plurality of group identifiers, including the first group identifier, and the session manager is configured to select the first group identifier on the basis of the first geographical code and the mapping between the plurality of geographical codes and the plurality of group identifiers.

In a seventh possible implementation form of network entity according to the first aspect as such or any one of the first to sixth implementation form thereof, the first geographical code is a first geographical RNTI (radio network temporary identifier) and the encoder is configured to scramble the message or a CRC (cyclic redundancy check) portion of the message using the first geographical RNTI for encoding on a MAC level or a physical level at least a portion of the message intended for the at least one mobile communication device.

In an eighth possible implementation form of network entity according to the first aspect as such or any one of the first to seventh implementation form thereof, the network entity is implemented as a base station or as a part thereof.

In a ninth possible implementation form of network entity according to the eighth implementation form of the first aspect, the communication interface is further configured to send the message to at least one neighboring network entity implemented as a neighboring base station or as a part thereof.

In a tenth possible implementation form of the network entity according to the first aspect as such or any one of the first to ninth implementation form thereof, the communication interface is further configured to receive a message from a mobile communication device, wherein at least a portion of the message is encoded on a MAC level and/or a physical level with a further geographical code, wherein the further geographical code is associated with a geographical region including or close to a current geographical position of the mobile communication device, and wherein the MAC and/or PHY level encoder is configured to decode on a MAC level and/or a physical level at least a portion of the message using the further geographical code.

According to a second aspect, the disclosure relates to a method of operating a network entity for a communication network for providing a plurality of communication services to a plurality of mobile communication devices. The method comprises the steps of: selecting a first geographical code from a plurality of geographical codes, wherein each geographical code is associated with a geographical region and wherein the first geographical code is associated with a first geographical region including or close to (i.e. in the vicinity of) a current geographical position of at least one of the plurality of mobile communication devices, encoding on a MAC level or a physical level at least a portion of a message intended for the at least one mobile communication device using the first geographical code, and sending the message with the portion encoded with the first geographical code to the at least one mobile communication device.

The method according to the second aspect can be performed by the network entity according to the first aspect. Further features of the method according to the second aspect result directly from the functionality of the network entity according to the first aspect and its different implementation forms.

According to a third aspect, the disclosure relates to a mobile communication device configured to use one or more of a plurality of communication services provided by a communication network, the mobile communication device comprising a communication interface configured to receive a message from a network entity of the communication network, wherein at least a portion of the message is encoded on a MAC level or a physical level with a first geographical code, wherein the first geographical code is associated with a geographical region including or close to a current geographical position of the mobile communication device, and a processor configured to decode on a MAC level or a physical level the encoded portion of the message using the first geographical code.

In a first possible implementation form of the mobile communication device according to the third aspect as such, the first geographical code is a first geographical RNTI (radio network temporary identifier) and the processor is configured to descramble the message or a CRC (cyclic redundancy check) portion of the message using the first geographical RNTI for decoding on a MAC level or a physical level the encoded portion of the message.

In a second possible implementation form of the mobile communication device according to the third aspect as such or the first implementation form thereof, the processor is configured to select a further geographical code from a plurality of geographical codes, wherein each geographical code is associated with a geographical region and wherein the further geographical code is associated with a geographical region including or close to the current geographical position of the mobile communication device, and to encode on a MAC level and/or a physical level at least a portion of a message intended for the network entity using the further geographical code, and wherein the communication interface is configured to send the message with the portion encoded with the further geographical code to the network entity.

According to a fourth aspect, the disclosure relates to a method of operating a mobile communication device configured to use one or more of a plurality of communication services provided by a communication network. The method comprises the steps of: receiving a message from a network entity of the communication network, wherein at least a portion of the message is encoded on a MAC level or a physical level with a first geographical code, wherein the first geographical code is associated with a geographical region including or close to a current geographical position of the mobile communication device, and decoding on a MAC level or a physical level the encoded portion of the message using the first geographical code.

The method according to the fourth aspect can be performed by the mobile communication device according to the third aspect. Further features of the method according to the fourth aspect result directly from the functionality of the mobile communication device according to the third aspect and its different implementation forms.

According to a fifth aspect, the disclosure relates to a computer program comprising a program code for performing the method of the second aspect or the method of the fourth aspect when executed on a computer.

The disclosure can be implemented in hardware and/or software.

BRIEF DESCRIPTION OF THE DRAWINGS

Further embodiments of the disclosure will be described with respect to the following figures, wherein:

FIG. 4 shows a schematic diagram illustrating exemplary geographical areas implemented in embodiments of the disclosure;

FIG. 7 shows a schematic diagram of a first exemplary network topology for illustrating different aspects of embodiments of the disclosure;

FIG. 20a shows a schematic diagram of an exemplary message sent from a first network entity to a second network entity according to an embodiment of the disclosure;

FIG. 20b shows a schematic diagram of an exemplary message comprising a Geo-RNTI value and a TMGI value according to an embodiment;

FIG. 20c shows a schematic diagram of exemplary TMGI mapping tables used in network entities according to an embodiment of the disclosure;

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
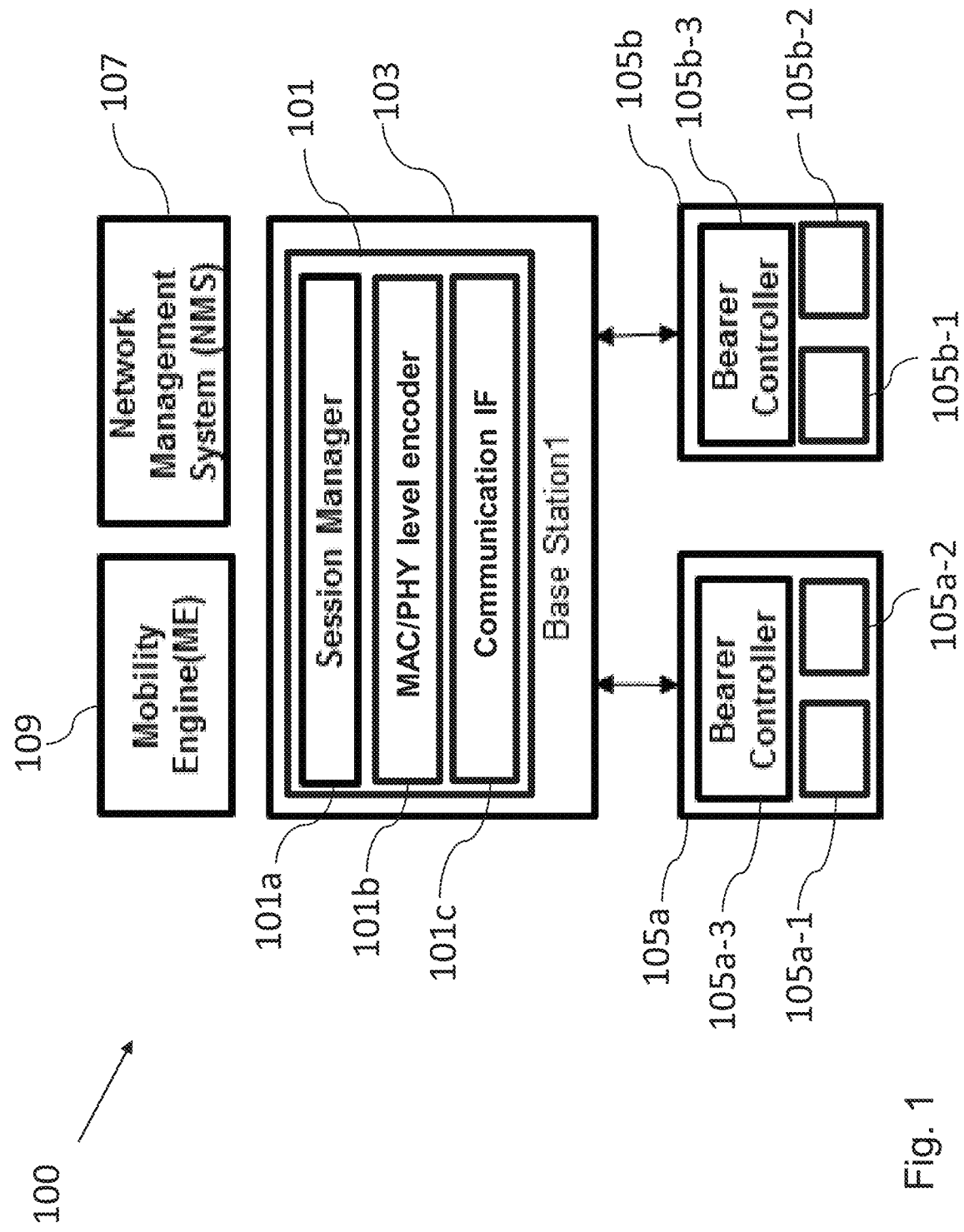
FIG. 1 shows a schematic diagram illustrating a wireless communication network including a mobile communication device according to an embodiment and a network entity according to an embodiment.

FIG. 1 shows a schematic diagram illustrating a wireless communication network 100 including a plurality of mobile communication devices 105a, 105b according to an embodiment and a network entity 101 according to an embodiment. In an embodiment, the mobile communication devices 105a, 105b can be mobile phones or mobile communication units of respective vehicles, in particular cars.

In an embodiment, the communication network 100 comprises a base station 103, wherein the base station is either provided by the network entity 101 or implemented as a part thereof (as illustrated in FIG. 1). The network entity 101 is configured to provide a plurality of communication services to the plurality of mobile communication devices 105a, 105b. Moreover, in the embodiment shown in FIG. 1 the communication network 100 comprises a mobility engine (ME) 109 and a network management system (NMS) 107.

According to an embodiment, the network entity 101 comprises a session manager 101a configured to select a first geographical code from a plurality of geographical codes, wherein each geographical code is associated with a geographical region and wherein the first geographical code is associated with a first geographical region including or close to (i.e. in the vicinity of) a current geographical position of at least one of the plurality of mobile communication devices 105a, 105b, an encoder 101b configured to encode, in particular on a MAC level and/or on a physical (PHY) level, at least a portion of a message intended for the at least one mobile communication device 105a, 105b using the first geographical code, and a communication interface 101c configured to send the message with the portion encoded with the first geographical code to the at least one mobile communication device 105a, 105b.

According to an embodiment, the mobile communication device 105a comprises a communication interface 105a-1 configured to receive a message from the network entity 101 of the communication network 100, wherein at least a portion of the message is encoded with the first geographical code, wherein the first geographical code is associated with a geographical region including or close to the current geographical position of the mobile communication device 105a and a processor 105a-2 configured to decode, in particular on a MAC and/or on a PHY level, the encoded portion of the message using the first geographical code. Moreover, in an embodiment the mobile communication device 105a can comprise a bearer controller 105a-3, as will be described in more detail further below.

Further embodiments of the network entity 101 and the mobile communication device 105a will be described in the following, wherein in the following embodiments the mobile communication devices 105a, 105b are implemented as a mobile communication unit of respective vehicles v1 and v2. However, as already mentioned above, the mobile communication devices 105a, 105b are not restricted to mobile communication units of vehicles, but can be configured, for instance, as mobile phone or other mobile communication devices as well.

In an embodiment, the first geographical code is a first geographical RNTI (radio network temporary identifier). Thus, according to an embodiment, the mobility engine 109 and the network entity 101 are pre-configured by the network management system (NMS) 107 with certain geographical radio network temporary identifiers (Geo-RNTI) values based on service type (multicast/broadcast), QoS class or service region. In particular, since the mobile communication devices 105a, 105b (e.g., vehicles) can follow a predefined trajectory (e.g., highway) between source and destination, certain geographical regions can be predefined such that every mobile communication device 105a, 105b (e.g., vehicle) can download a group of preconfigured geographical IDs or Geo-RNTI values which can be correlated with the trajectory from source to destination. The values of the preconfigured geo-RNTI can be known to every vehicle and every base station (BS) 103. Moreover, the geo-RNTI values can be the main component of the downlink (DL)/uplink (UL) and sidelink (SL) communications. In addition to that, due to the diversity of multiple services, different Geo-RNTIs can be considered for different services, so that every vehicle can do a mapping between services and Geo-RNTI values. These Geo-RNTI values can also be communicated to the mobile communication devices 105a, 105b beforehand (e.g., during an initial attachment procedure, a location update procedure and/or a handover procedure).

In an embodiment, during regular communication, the downlink information sent by base station 103 can be scrambled with the preconfigured or predetermined Geo-RNTI values. Moreover, the mobile communication devices 105a, 105b can also transmit information in uplink and/or sidelink by using the preconfigured geo-RNTI values and also search for control and data channels by descrambling the received information with the pre-configured Geo-RNTI values in the downlink and/or sidelink. Once the mobile communication devices 105a, 105b find relevant information, this information can be further processes as will be described in more detail in the following.

In an embodiment, the session manager (SM) 101a of the network entity 101 can be configured to assign a temporary mobile group identity (TMGI) to multicast sessions and Geo-radio network temporary identifiers (RNTI) values for groups. In particular, TMGI is defined by 3GPP and used to identify an MBMS bearer service together with session ID and flow ID (e.g., see 3GPP TS 26.346 V13.5.0 (2016-06). "Multimedia Broadcast/Multicast Service (MBMS), Protocols and codecs" for more details), while RNTIs are used for scrambling the CRC values of the control or data channel information (see 3GPP TS 36.321 V13.2.0 (2016-06) Evolved Universal Terrestrial Radio Access (E-UTRA); "Medium Access Control (MAC) protocol specification" for more details). Moreover, the session manager (SM) 101a can perform group management by adding or removing group members.

The mobility engine (ME) 109 can be used for initial attach and location management (e.g. location update and/or handover). In particular, during these processes, Geo-RNTI values and related information can be communicated to the mobile communication devices 105a, 105b.

The bearer controllers (BC) 106a, 106b of the mobile communication devices 105a, 105b can be configured to establish bearers (e.g., dedicated unicast/multicast bearers for V2X communication).

According to an embodiment, the network management system (NMS) 107 configures Geo-RNTI values in the session manager (SM) 101a of the network entity 101 and in the mobility engine (ME) 109. The Geo-RNTI values can be predetermined based on certain geographical regions and service types. In particular, the network entity 101 can use this information to create a mapping between Geo-RNTI values and TMGI values. Furthermore, the ME 109 can pass Geo-RNTI information to the mobile communication devices 105a, 105b (e.g., to vehicles that can perform a network attachment, a location update and/or a handover in the communication network 100). The geographical region can be as wide as a cell range or can be partitioned into smaller areas (e.g., based on street or highway structures) within a particular cell range. According to an embodiment, these regions can also correspond to neighboring cells which partially overlap, in such a way that every mobile communication device 105a, 105b can have the complete knowledge of all possible Geo-RNTI values in its region of interest.

According to an embodiment, the Geo-RNTI values can be updated once the mobile communication device 105a, 105b approaches an edge of a known geographical region. In particular, the ME 109 can update the Geo-RNTI values in the mobile communication devices 105a, 105b. For example, each time a cell handover takes place, the ME 109 can perform Geo-RNTI updates of the mobile communication devices 105a, 105b. In another embodiment, the region of interest can be as big as a city (or a country), in such a way that the complete information can be uploaded to the mobile communication devices 105a, 105b at once. Once the complete information is uploaded to the mobile communication devices 105a, 105b, the mobile communication devices 105a, 105b can be used for regular communication.

Moreover, in the downlink direction, the base station 103 can use Geo-RNTI values (assigned by the session manager (SM) 101a) for scrambling the messages concerning certain regions and services. Furthermore, the mobile communication devices 105a, 105b can continuously check the data and the control channels (e.g., physical downlink control channel (PDCCH) and physical downlink shared channel (PDSCH) channels), which can be relevant for V2X information, by means of descrambling the received messages with predetermined Geo-RNTI values. In the case a message contains one of the predetermined Geo-RNTI values, the bearer controller (BC) 105a-3, 105b-3 of the mobile communication devices 105a, 105b can be configured to check for which service the message is relevant. If a message is relevant for a particular service (e.g., for a lane merge request), then the bearer controller (BC) 105a-3, 105b-3 can establish the relevant bearer for that particular service. Moreover, the physical (PHY) layer and/or the media access control (MAC) layer of the mobile communication device 105a, 105b, can pass the information to higher layer V2X applications for further processing.

Embodiments of the disclosure have the advantage of fast localized communication solutions in mobile communication networks due to the fact that multi-cast groups and multi-cast/broadcast channels can be preconfigured. Moreover, embodiments of the disclosure require less complexity in the network compared to the MBMS architecture such as in the state-of-the art, due to the fact that a layer-2 broadcast/multicast functionality is used without requiring a full core network and IP functionality.

Figure 2:
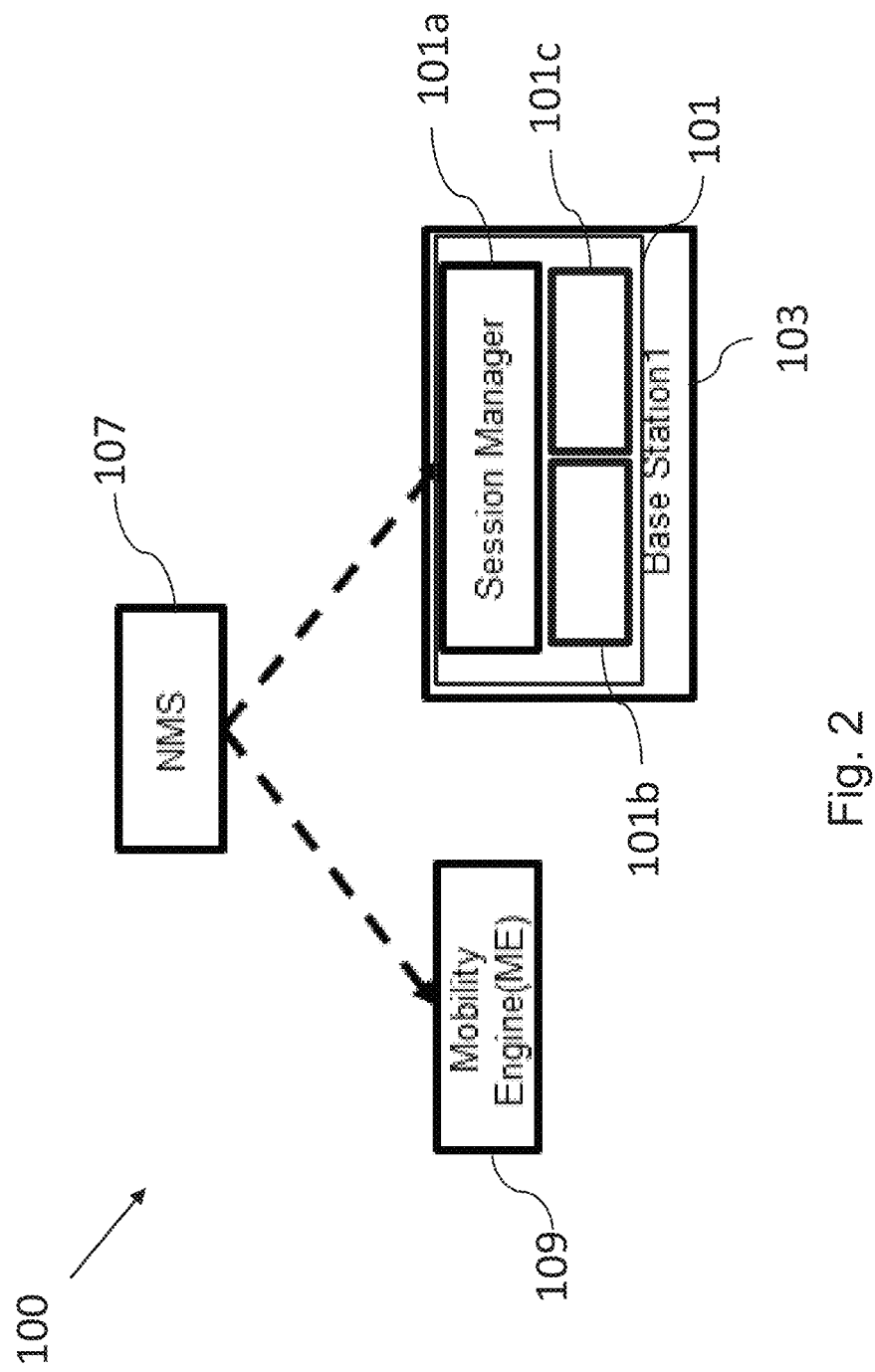
FIG. 2 shows a schematic diagram illustrating a wireless communication network including a network entity according to an embodiment.

FIG. 2 shows a schematic diagram illustrating a further embodiment of the network entity 101 in the communication network 100.

According to an embodiment of the disclosure, the network management system (NMS) 107 configures the session manager 101a (SM) collocated within the base station 103 as well as the mobility engine (ME) 109 with Geo-RNTI values for every predefined geographical region and service.

Figure 3:
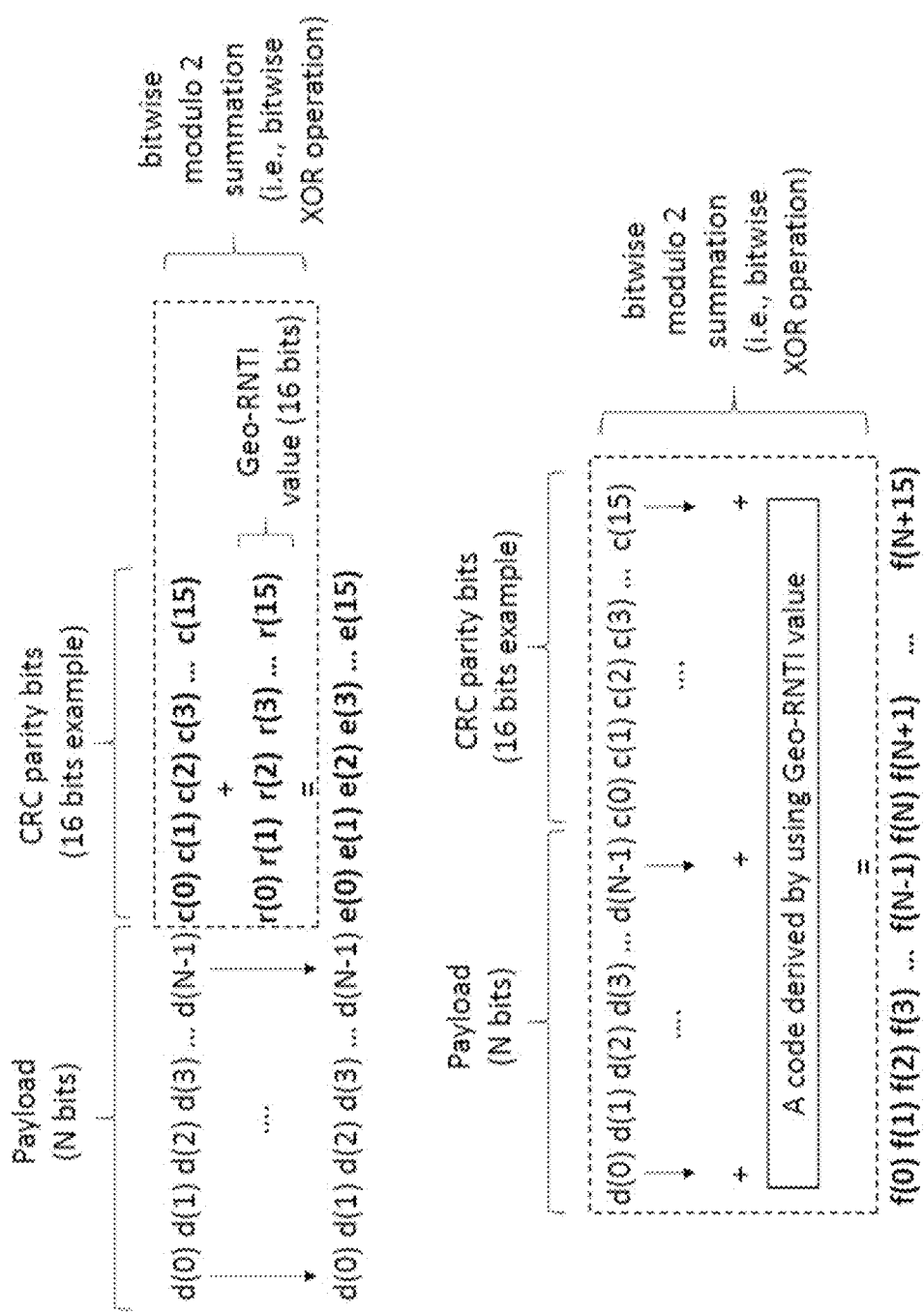
FIG. 3 shows a schematic diagram illustrating exemplary MAC/PHY level RNTI operations implemented in embodiments of the disclosure.

FIG. 3 shows a schematic diagram illustrating an implementation form of encoding a message on a MAC and/or PHY level based on an operation using a geographical code in form of a Geo-RNTI as implemented in embodiments of the disclosure.

In the exemplary embodiment shown in FIG. 3, a Geo-RNTI (value) is used to scramble the CRC part of the data and/or control channel information sent in the uplink, downlink or sidelink. In the example shown in the upper half of FIG. 3, the scrambling is performed by doing bitwise module 2 summation (i.e., bitwise XOR operation) of the CRC part and the Geo-RNTI value. Moreover, in order to descramble the information, the mobile communication device 105a, 105b should have the right RNTI value in advance, otherwise the decoding cannot be performed satisfactorily although the information is received by the vehicle without any error. In another embodiment, the Geo-RNTI can be used to derive a code for scrambling the complete message on the PHY level, as illustrated by the example shown in the lower half of FIG. 3.

Thus, as can be taken from FIG. 3, embodiments of the disclosure can make use of the conventional way of scrambling the CRC part of a message by a RNTI. For illustrative purposes the following table from 3GPP TS 36.321 V13.2.0 (2016-06) Evolved Universal Terrestrial Radio Access (E-UTRA); "Medium Access Control (MAC) protocol specification" illustrates a plurality of conventional RNTIs.

| Value (hexa-decimal) | RNTI |
|---|---|
| 0000 | N/A |
| 0001-0960 | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI (see note), G-RNTI |

-continued

| Value (hexa-decimal) | RNTI |
| --- | --- |
| 0961-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI, G-RNTI |
| FFF4-FFF9 | Reserved for future use |
| FFFA | SC-N-RNTI |
| FFFB | SC-RNTI |
| FFFC | CC-RNTI |
| FFFD | M-RNTI |
| FFFE | P-RNTI |
| FFFF | SI-RNTI |

For example, a Cell-RNTI (C-RNTI) identifies a UE (i.e. mobile communication device) having a RRC connection within a cell. When the BS 103 sends a downlink data to a user, it can perform the above mentioned procedure for the control data (e.g. PDCCH) and the user can check whether the received control data passes the CRC check. If it passes the check, then the UE can identify the corresponding downlink PDSCH scheduling assignment.

According to an embodiment of the disclosure different predefined or predetermined RNTI values can be assigned for different geographical regions and services. One exemplary definition of the geographical area can be defined based on ETSI EN 302 931 V1.0.0 as shown in FIG. 4, wherein a circular area, a rectangular area and an ellipsoidal area are shown.

In embodiments of the disclosure, the geographical area can also have any other shape which can be appropriate for capturing motion patterns of the mobile communication devices 105a, 105b (e.g., some parts of a street or a highway can be also a geographical area). Therefore, the geographical area may comprise several physical cell IDs (PCIs) or street identifiers or any similar identifier.

Figures 5A, 5B:
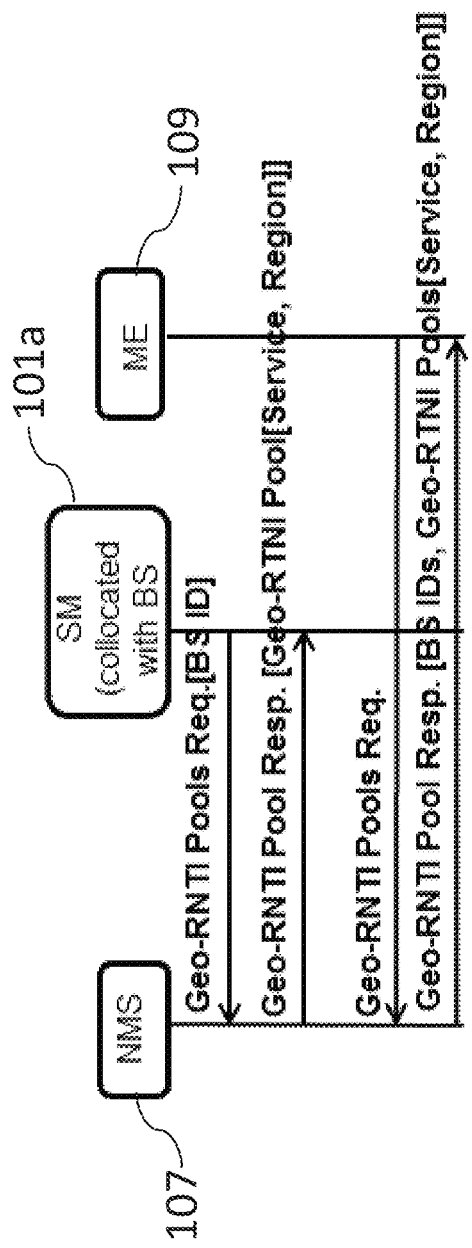
FIG. 5a shows a schematic diagram illustrating a signaling exchange in a wireless communication network including a session manager according to an embodiment.
FIG. 5b shows an exemplary mapping table implemented in embodiments of the disclosure.

FIG. 5a shows a schematic diagram illustrating a signaling exchange in the communication network 100 including the session manager 101a of the network entity 101 and the mobility engine (ME) 109 according to an embodiment.

According to an embodiment, during the initialization phase of the communication network 100, the NMS 107 can configure the SM 101a (collocated with the base station 103 as well as other session managers collocated with other base stations) and the ME 109 with Geo-RNTI values (together with some other network configuration signaling) so that each SM 101a and the ME 109 can be aware of the necessary Geo-RNTI information for every relevant geographical area and service type. In another embodiment, the SM 101a of the network entity 101 can also get the Geo-RTNI configuration from the ME 109 after the NMS 107 configures the ME 109.

Once the SM 101a of the network entity 101 is configured with the Geo-RNTI values, it can create a mapping table which maps certain Geo-RNTI values to certain TMGI values for every service and geographical region as shown in FIG. 5b. The SM 101a can decide which TMGI can be used for certain services during the run time (i.e., when the actual service requests are sent by the mobile communication devices 105a, 105b, e.g. vehicles to the SM 101a). In addition, in case one service is used multiple times in one region, the SM 101a of the network entity 101 can assign a different TMGI for the same Geo-RNTI. Moreover, the mobile communication devices 105a, 105b can also know the mapping between assigned TMGIs and Geo-RNTIs.

FIG. 5b shows an exemplary mapping table implemented in the session manager 101a of the network entity 101 according to an embodiment of the disclosure. In this embodiment, the mapping table shows an exemplary configuration for cooperative collision avoidance (CCA) and lane merging (LM) services. In particular, if the service is not in use in a region at a certain time, then the TMGI value is not available at that time for the mapping and this is shown with not available (N/A) in FIG. 5b. In particular, FIG. 5b shows the initial values of the TMGI mapping table. In an embodiment, TMGI values can also be pre-configured before a session request message is received.

Figure 6:
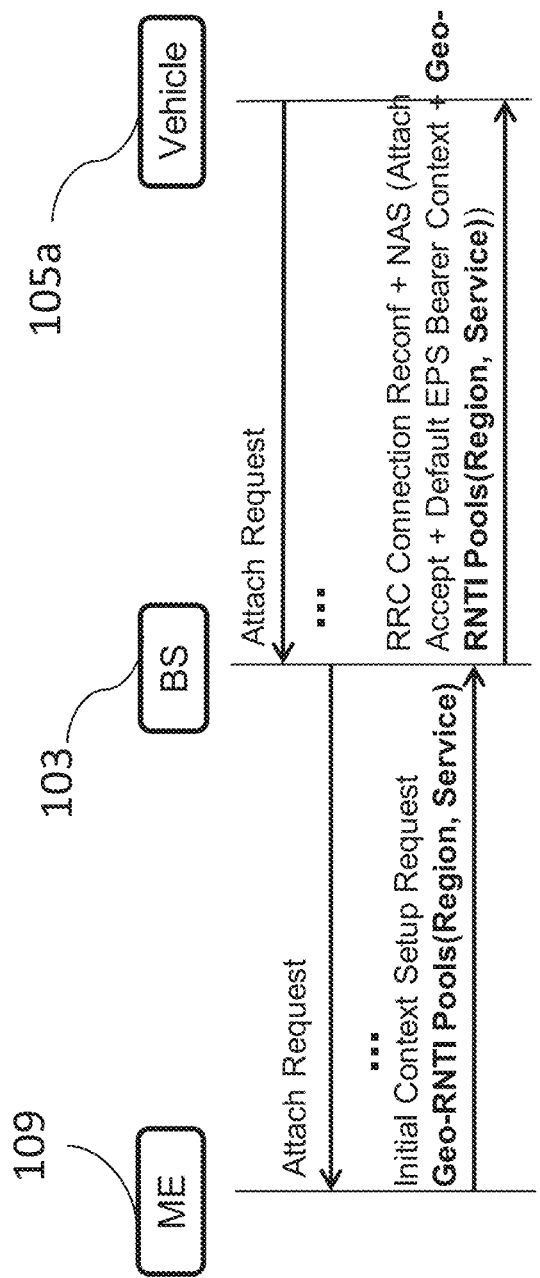
FIG. 6 shows a schematic diagram illustrating an interaction between a network entity according to an embodiment and a communication device according to an embodiment for providing the communication device with Geo-RNTI values.

FIG. 6 shows a schematic diagram illustrating an interaction between the mobility engine 109 and the mobile communication device 105a according to an embodiment for providing the communication device 105a with Geo-RNTI values.

According to an embodiment, the mobile communication device 105a receives the related Geo-RNTI information during, for instance, an initial attachment (and/or during a handover and/or a location update procedure) from the ME 109 as a part of the NAS (non-access stratum) signaling as shown in FIG. 6. Then, once the mobile communication device 105a is configured with Geo-RNTI information, it can start to process the received control and data channels (e.g., PDCCH and PDSCH) by descrambling the received data with preconfigured Geo-RNTI values.

FIG. 7 shows a schematic diagram of a first exemplary network topology for illustrating different aspects of embodiments of the disclosure. In the exemplary embodiment shown in FIG. 7, the mobile communication device 105a, e.g. vehicle v1, is configured to perform a V2X service (e.g., lane merge) with the mobile communication devices 105b, 105c, e.g. vehicles v2 and v3, in region-1 via up-link (UL)/down link (DL) communication according to two different scenarios. In the first scenario, all group members are known a priori by the mobile communication device 105a, e.g. vehicle v1, which sends a service request. In the second scenario, the service request carries information about the group members v1, v2 and v3, but, when the SM 101a receives the service request, it realizes that an additional vehicle, i.e. mobile communication device, should be added to the group.

In one embodiment, every V2X service starts with a service request message sent by a mobile communication device, e.g. vehicle v1, to a group of mobile communication devices, e.g. vehicles v2 and v3. In one embodiment, all the mobile communication devices, e.g. vehicles v1, v2 and v3, are located within the coverage area of the same base station (BS) 103. For example, the service request message could be a "lane merge request message" of a lane merging service or a collision notification and a request message concerning the state of the mobile communication devices in a cooperative collision avoidance service.

Figure 8A:
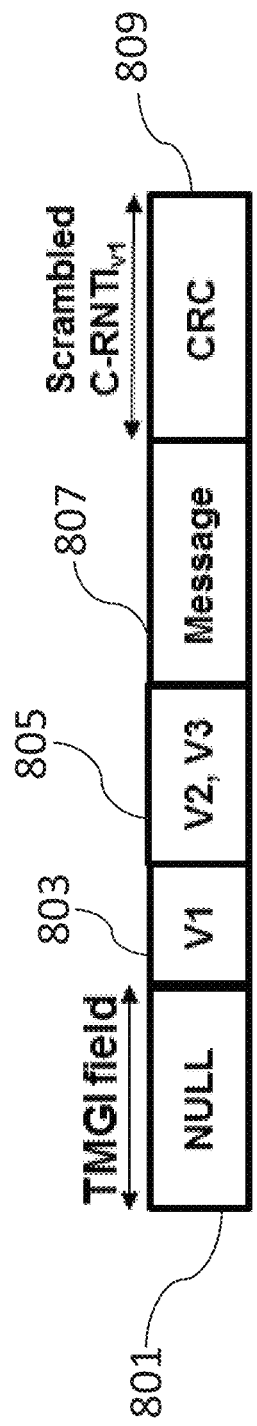
FIG. 8a shows a schematic diagram of an exemplary service request message according to embodiments of the disclosure.

According to an embodiment, the mobile communication device 105a, e.g. vehicle v1, is configured to initialize a V2X service, but does not have any TMGI (and session ID, flow ID) assigned. The mobile communication device 105a, e.g. vehicle v1, only knows its position and the possible Geo-RNTI values of its region. As shown in FIG. 8a, the mobile communication device 105a, e.g. vehicle v1, can create a service request message (e.g., a lane merge request), wherein the TMGI value 801 is set to NULL and v1 is set as the source 803, the mobile communication devices 105b (e.g. vehicle v2) and 105c (e.g. vehicle v3) are set as destinations 805 and the message 807 is provided to lower layers. According to an embodiment, the mobile communication device 105a (e.g. vehicle v1) (that may be in connected mode) performs a standard UL transmission. In this case, the mobile communication device 105a (e.g. vehicle v1) can create and send a scheduling request (for UL). The base station (BS) 103 can receive the scheduling request and can allocate a radio resource for UL transmission and can send the grant to the mobile communication device 105a (e.g. vehicle v1). Then, the mobile communication device 105a (e.g. vehicle v1) can receive the grant and can send the lane merge request message in which the CRC part is scrambled with the Cell-RNTI of the mobile communication device 105a, i.e. vehicle v1, (i.e., C-RNTI$_{v1}$) 809, as shown in FIG. 8a.

Figure 8B:
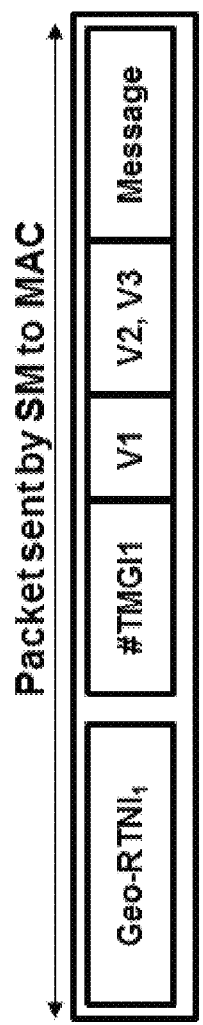
FIG. 8b shows a schematic diagram of an exemplary message comprising a Geo-RNTI value and a TMGI value according to embodiments of the disclosure.
Figure 8C:
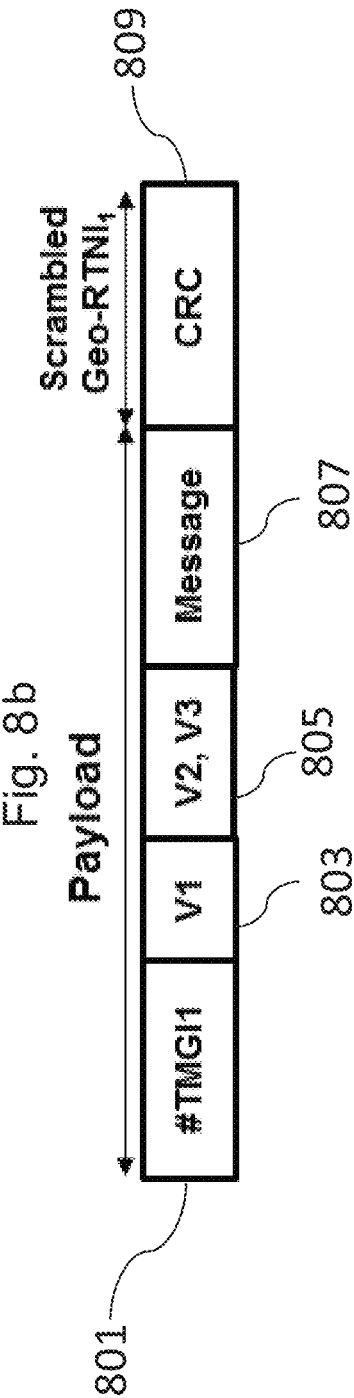
FIG. 8c shows a schematic diagram of an exemplary message scrambled with a Geo-RNTI value according to embodiments of the disclosure.

In one embodiment, the base station 103 receives the message and realizes that the TMGI value is NULL. Then, it can pass the message to the session manager (SM) 101a of the network entity 101. When the SM 101a realizes that the TMGI value is NULL, then it can assign a TMGI value for the message and can map it to a certain Geo-RNTI value or values based on the location of the group of mobile communication devices, i.e. vehicles (i.e., v1, v2 and v3), and service type. In one embodiment, the locations of the mobile communication devices, e.g. vehicles, are explicitly sent by the mobile communication devices to the base station 103 or the message content carries location information of all mobile communication devices within the group. Since, in this embodiment, the mobile communication devices, e.g. vehicles v2 and v3, belong to the same region controlled by the same base station 103, the SM 101a of the network entity 101 creates one message with Geo-RNTI$_1$ without changing the message content. Finally, the SM 101a can hand over the message shown in FIG. 8b to the MAC and/or PHY level encoder 101b of the network entity 101. Thereafter, the MAC and/or PHY level encoder 101b can receive the service request (e.g., lane merge request) message and create a CRC of the payload scrambled with the Geo-RTNI$_1$, and pass it to physical layer for downlink transmission as shown in the FIG. 8c. As already mentioned above, in an embodiment the complete message can also be scrambled with a code derived from a Geo-RNTI value, as shown in FIG. 3. Since, in this embodiment, every mobile communication device, e.g. vehicle, in the coverage of the BS 103 knows all configurable Geo-RNTIs in advance, they descramble the message successfully with the Geo-RTNI$_1$. Once a mobile communication device, e.g. vehicle, gets the message, the bearer controller (BC) 106a located thereof can check for which service the message is relevant. Once the BC 106a checks that it is relevant for a certain service (e.g., lane merge request), it establishes the relevant bearer for that service and the message is delivered to higher layers of the mobile communication device, e.g. vehicle. Finally, an application running at the application level of the mobile communication device, e.g. vehicle, checks the message (e.g., lane merge request) and records the corresponding TMGI value and can perform further actions. Once all destinations receive the service request, they can create a response message and send it to a multicast/broadcast group identified by a certain TMGI (and also flow ID or session ID).

Figure 9:
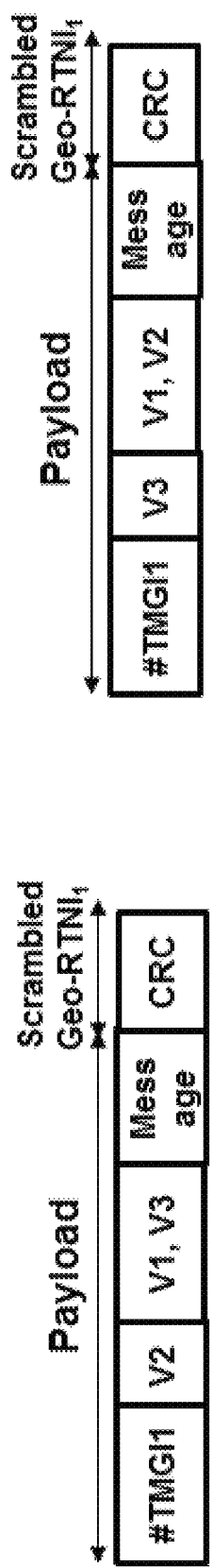
FIG. 9 shows a schematic diagram of two exemplary service response messages scrambled with a Geo-RNTI value according to embodiments of the disclosure.

In particular, according to an embodiment, the mobile communication devices 105b, 105c, e.g. vehicles v2 and v3, create a service response (e.g., lane merge response) with the TMGI1 and provide it to the lower layers. The lower layers can perform regular UL transmissions for a lane merge response message. When both messages reach the corresponding MAC and/or PHY level encoder 101b of the network entity 101, it can create two separate messages for each response message, wherein the CRC parts of the messages are scrambled with the same Geo-RNTI value. Afterwards, the messages can be passed to the physical layer for downlink transmission as shown in FIG. 9.

Figure 10:
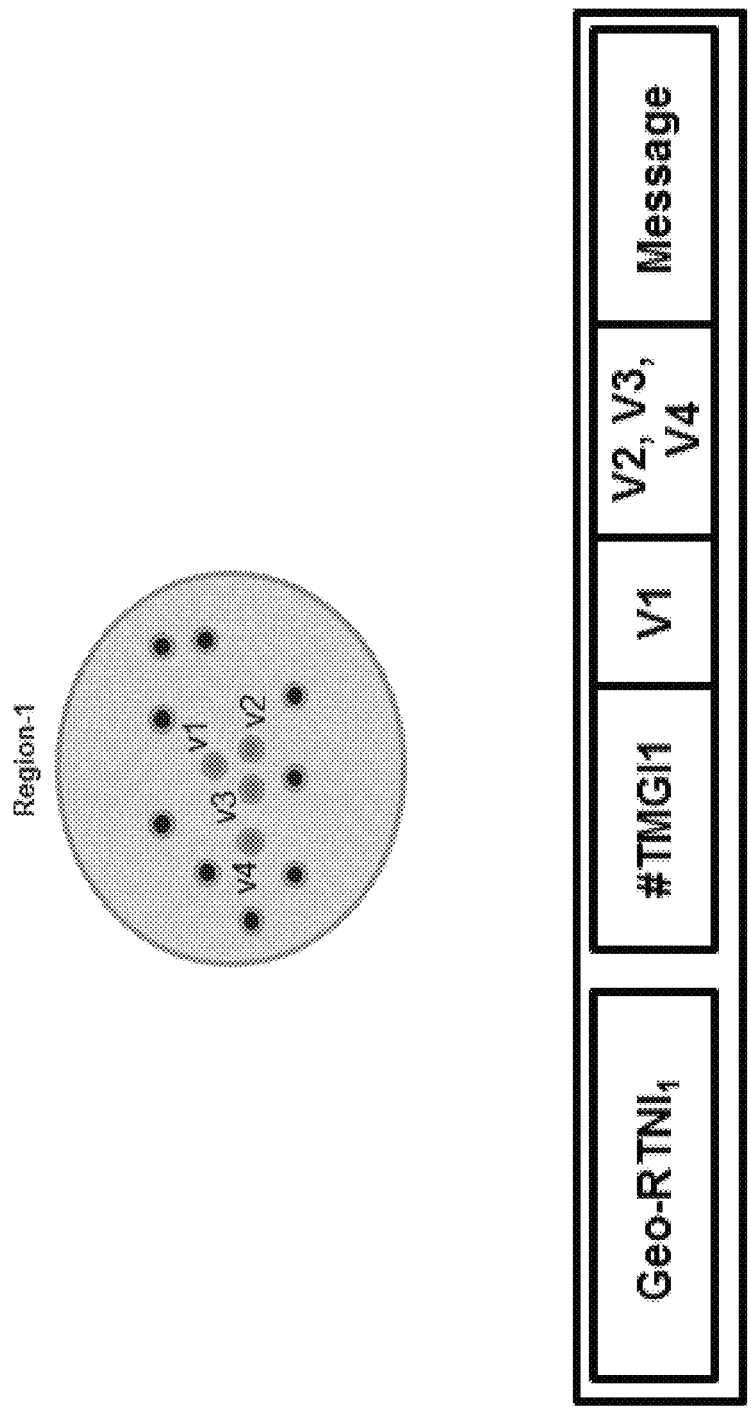
FIG. 10 shows a schematic diagram of an exemplary network topology and an exemplary service request message after the assignment of Geo-RNTI and TMGI values according to an embodiment.

FIG. 10 shows a schematic diagram of an exemplary network topology and an exemplary service request message according to an embodiment. In an embodiment of the disclosure, the SM 101a of the network entity 101 can have a better knowledge of the traffic situation of the mobile communication devices, e.g. vehicles, compared to each individual vehicle v1, v2, v3 and v4 in the cell. Therefore, the SM 101a can be configured to add/remove members to/from a group. In such an embodiment, the mobile communication device 105a, e.g. vehicle v1, sends its service request (e.g., LM request) in the UL as a normal transmission and the SM 101a of the network entity 101 receives this service request (e.g., LM request) therefrom. Then, the SM 101a can add another mobile communication device, e.g. vehicle (e.g., v4), to the group as shown in FIG. 10.

The SM 101a can also pass the information to the MAC and/or PHY level encoder 101b of the network entity 101 so that the MAC and/or PHY level encoder 101b knows the mapping between Geo-RNTI and TMGI value.

Figure 11:
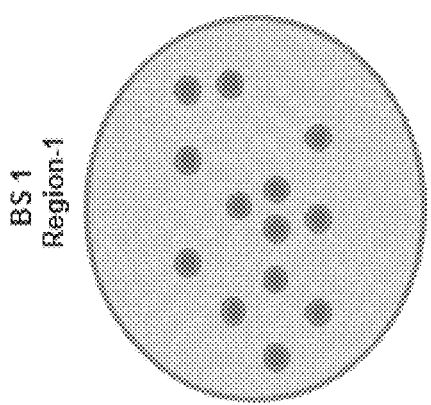
FIG. 11 shows a schematic diagram of an exemplary network topology and an exemplary Geo-RNTI mapping table with different services according to an embodiment.

FIG. 11 shows a schematic diagram of an exemplary network topology and an exemplary Geo-RNTI mapping table with different services according to an embodiment. In this embodiment, a base station, such as the base station 103, corresponds to or defines one geographical region. For example, if two services are available (e.g., CCA and LM) and six group of mobile communication devices, e.g. vehicles, want to have access to CCA and LM services separately (three groups of CCA and three groups of LM), then the mapping table can look as the one shown in FIG. 11. The group differentiation depending on the service can be performed at the application layer by checking the group TMGI values (this may also include session ID or flow ID).

Figure 12:
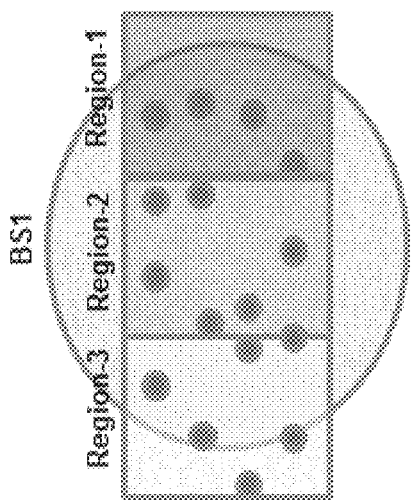
FIG. 12 shows a schematic diagram of an exemplary network topology and an exemplary Geo-RNTI mapping table with different services and geographical regions according to an embodiment.

FIG. 12 shows a schematic diagram of an exemplary network topology and an exemplary Geo-RNTI mapping table with different services according to an embodiment. In this embodiment, a base station, such as the base station 103, corresponds to or defines multiple geographical regions and knows which geographical regions are available in its cell range. For example, the base station BS1 shown in FIG. 12 serves the geographical regions one, two and three. If two services are available (e.g., CCA and LM) and two groups of mobile communication devices, e.g. vehicles, want to have access to CCA and LM in each region, then the mapping table implemented in the session manager 101a of the base station BS1 can look as the one shown in FIG. 12.

In the case of a service request message, the mobile communication device 105a, e.g. vehicle v1, can send a service request as a normal operation. When the SM 101a of the network entity 101 receives this service request, it can assign a TMGI value to the service request message together with the Geo-RNTI and can hand it over to the BS 103 for multicasting/broadcasting in the downlink. Due to the fact that anyone of the groups may not yet know the TMGI values, the SM 101a can either send explicitly to every group member (i.e., each mobile communication device, e.g. vehicle) the TMGI value used for this service as unicast message in the downlink (this unicast message can also be used for establishing a necessary bearer for that service in the mobile communication device). Alternatively, when all mobile communication devices, e.g. vehicles, receive the service request message which is Geo-RNTI scrambled in the downlink, each mobile communication device, e.g. vehicle, application can search the message content and check whether its ID is in the destination list. If its ID is in the message, then it can record and use the TMGI values carried in the message. Similarly, this message can also be used for establishing a necessary bearer for that service in the mobile communication device, i.e. vehicle.

Once every vehicle is informed about the TMGI value, follow up messages do not need to carry each destination vehicle separately in the message. In this case, it is enough to carry the source vehicle and the TMGI value of the multicast/broadcast group.

Figure 13:
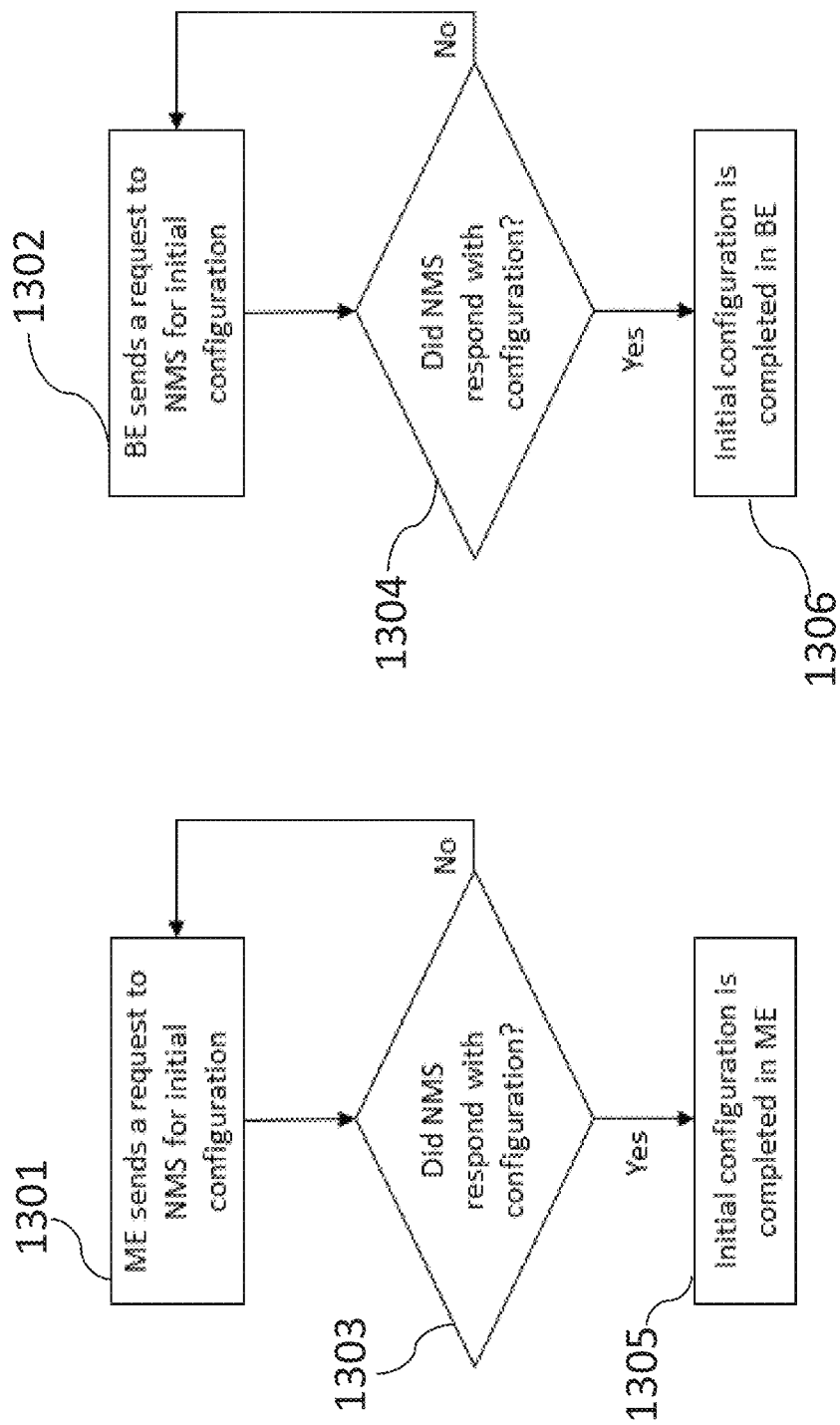
FIG. 13 shows a schematic diagram of a communication flowchart of an initial configuration of network entities in a communication network according to an embodiment.

FIG. 13 shows a schematic diagram of two communication flowcharts of an initial configuration of the mobile engine 109 and the network entity 101 according to an embodiment.

The flowchart on the left side of FIG. 13 shows the initial configuration of the mobility engine 109. In a first step 1301, the ME 109 sends a request to the NMS 107 for the initial configuration. If the NMS 107 responds positively to the request of the ME 109 (see step 1303), then the initial configuration of the ME 109 can be completed in step 1305 of FIG. 13.

Similarly, the flowchart on the right side of FIG. 13 shows the initial configuration of the base station 103 (or more specifically the network entity 101 co-located therewith). In a first step 1302, the BS 103 sends a request to the NMS 107 for the initial configuration. If the NMS 107 responds positively to the request of the BS 103 (see step 1304), then the initial configuration of the BS 103 can be completed in step 1306 of FIG. 13.

According to another embodiment, the BS 103 can initially be configured by the ME 109, after the NMS 107 has configured the ME 109.

Figure 14:
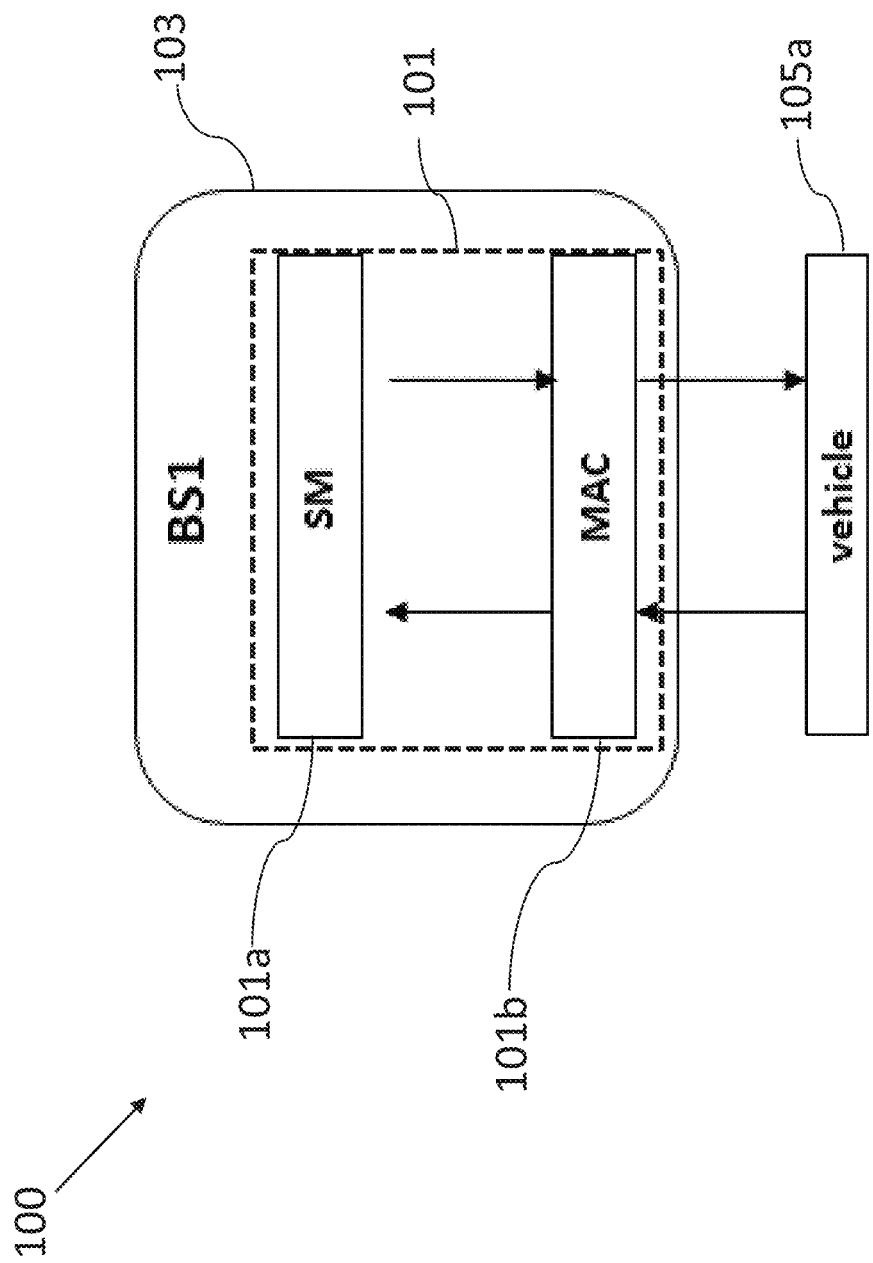
FIG. 14 shows a schematic diagram illustrating the protocol stack of a network entity according to an embodiment.

FIG. 14 shows a schematic diagram illustrating a protocol stack of the network entity 101 according to an embodiment. For the sake of clarity, the communication interface 101c and the bearer controller 105a-3 is not shown in FIG. 14. In the embodiment shown in FIG. 14, the MAC and/or PHY level encoder 101b of the network entity 101 is a MAC level encoder 101b configured to scramble on the MAC level the CRC portion of a message using a Geo-RNTI value.

In this embodiment, all messages pass through the MAC level encoder 101b of the network entity 101. Then, if the TMGI value is NULL in the message, then the MAC level encoder 101b passes the message to the SM 101a for the TMGI assignment and the Geo-RNTI mapping. Once the SM 101a has assigned the TMGI value and the Geo-RNTI mapping, it passes the message again to the MAC level encoder 101b for distribution. The MAC level encoder 101b can use this mapping all the time while sending the messages in the downlink. In other embodiments of the disclosure, there may be some additional functional layers between the MAC and/or PHY level encoder 101b and the SM 101a.

Figure 15:
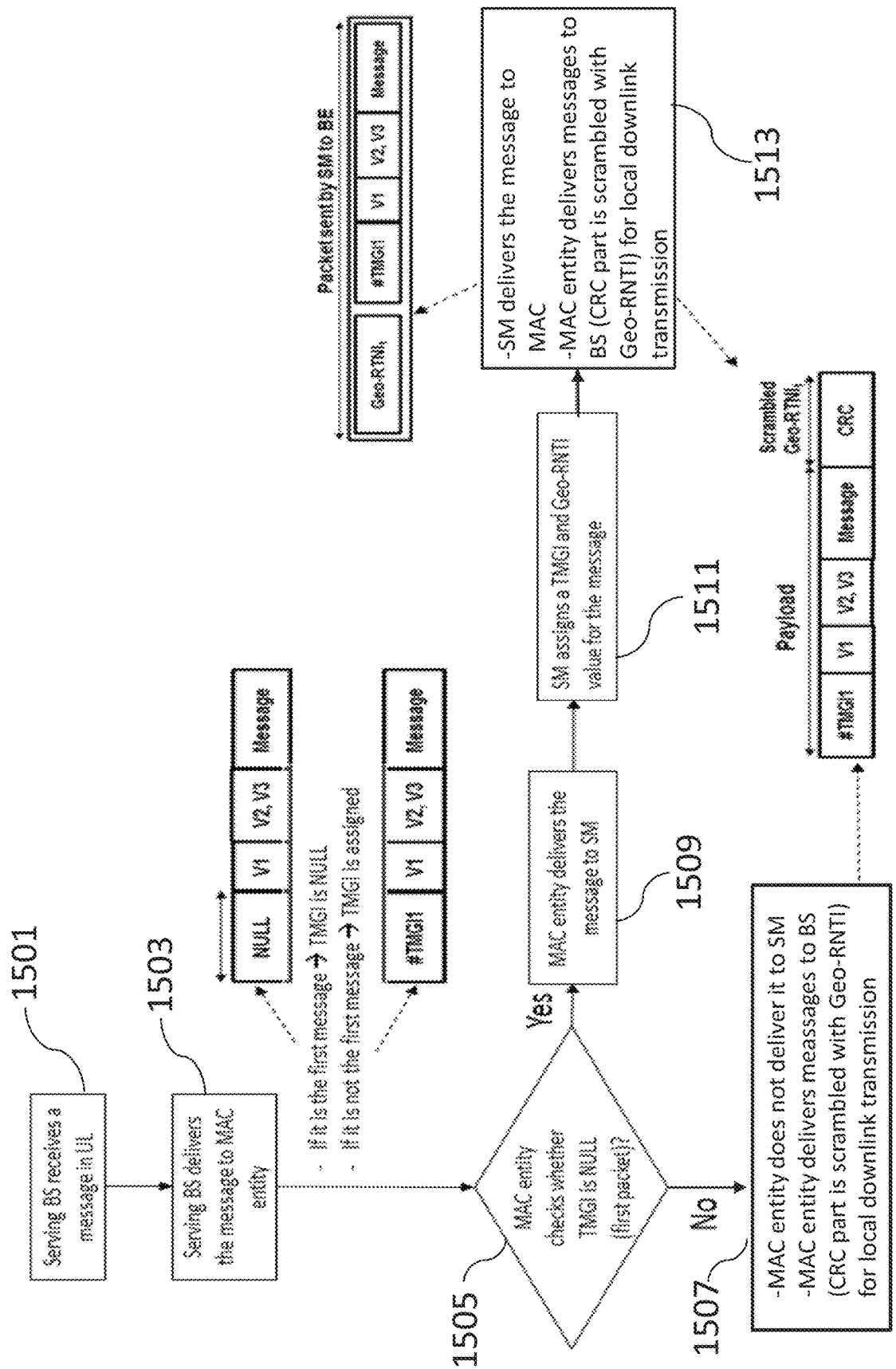
FIG. 15 shows a schematic diagram of a communication flowchart for message processing in a communication network comprising a network entity according to an embodiment.

FIG. 15 shows a schematic diagram of a communication flowchart for message processing in the communication network 100 comprising the network entity 101 according to an embodiment.

In a first step 1501, the serving BS 103 receives a message in the UL direction. In a second step 1503, the serving BS 103 delivers the message to the MAC level encoder 101b. If the message is the first one, then a NULL value is assigned to the TMGI, otherwise another value is assigned to the TMGI. Thereafter, the MAC level encoder 101b checks the value of the TMGI in a step 1505: if the TMGI value is NULL, then the MAC level encoder 101b does deliver the message to the SM 101a in a step 1509, otherwise the MAC level encoder 101b does not deliver the message to the SM 101a, but delivers it to the BS 103, wherein the CRC part of the message is scrambled with Geo-RTNI values for local downlink transmission (see step 1507). In case the MAC level encoder 101b delivers the message to the SM 101a (see step 1509), the SM 101a assigns a TMGI value and a Geo-RNTI value to the message (see step 1511). Thereafter, the SM 101a delivers the message to the MAC level encoder 101b, and the MAC level encoder 101b delivers the message to the BS 103, wherein the CRC part of the message is scrambled with the Geo-RNTI value for local downlink transmission (see step 1513).

Figure 16:
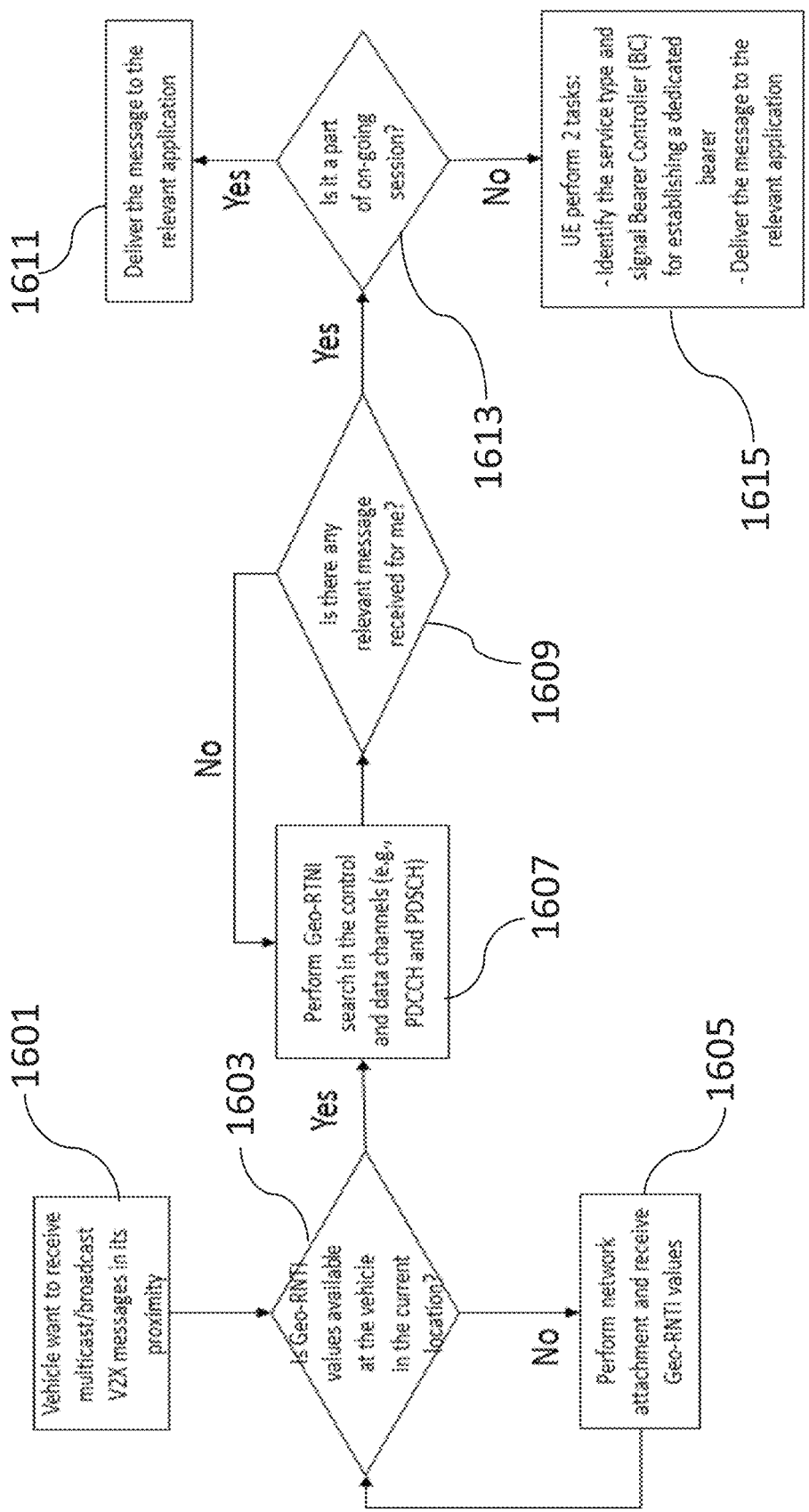
FIG. 16 shows a schematic diagram of a message reception flowchart for a mobile communication device according to an embodiment.

FIG. 16 shows a schematic diagram of a message reception flowchart of the mobile communication device 105a in the communication network 100 according to an embodiment.

In a first step 1601, the mobile communication device 105a, e.g. vehicle, looks for multicast/broadcast V2X messages in its proximity. In particular, if Geo-RNTI values are not available for the vehicle in its proximity (see step 1603), then the vehicle can perform a network attachment and/or location update and receive Geo-RNTI values (see step 1605), otherwise the vehicle performs a Geo-RNTI search in the control and data channels (e.g., PDCCH and PDSCH) (see step 1607). Thereafter, the device 105a, i.e. vehicle, checks if there are any relevant messages (see step 1609). If yes, then it checks if the relevant message is part of an ongoing session (see step 1613). If the relevant message belongs to an ongoing session, then the message is delivered to the relevant application (see step 1611), otherwise the device 105a, i.e. vehicle, can perform two different tasks (see step 1615), namely (a) identify the service type and send a corresponding signal to the bearer controller 105a-3 for establishing a dedicated bearer and (b) deliver the message to the relevant application.

Figure 17:
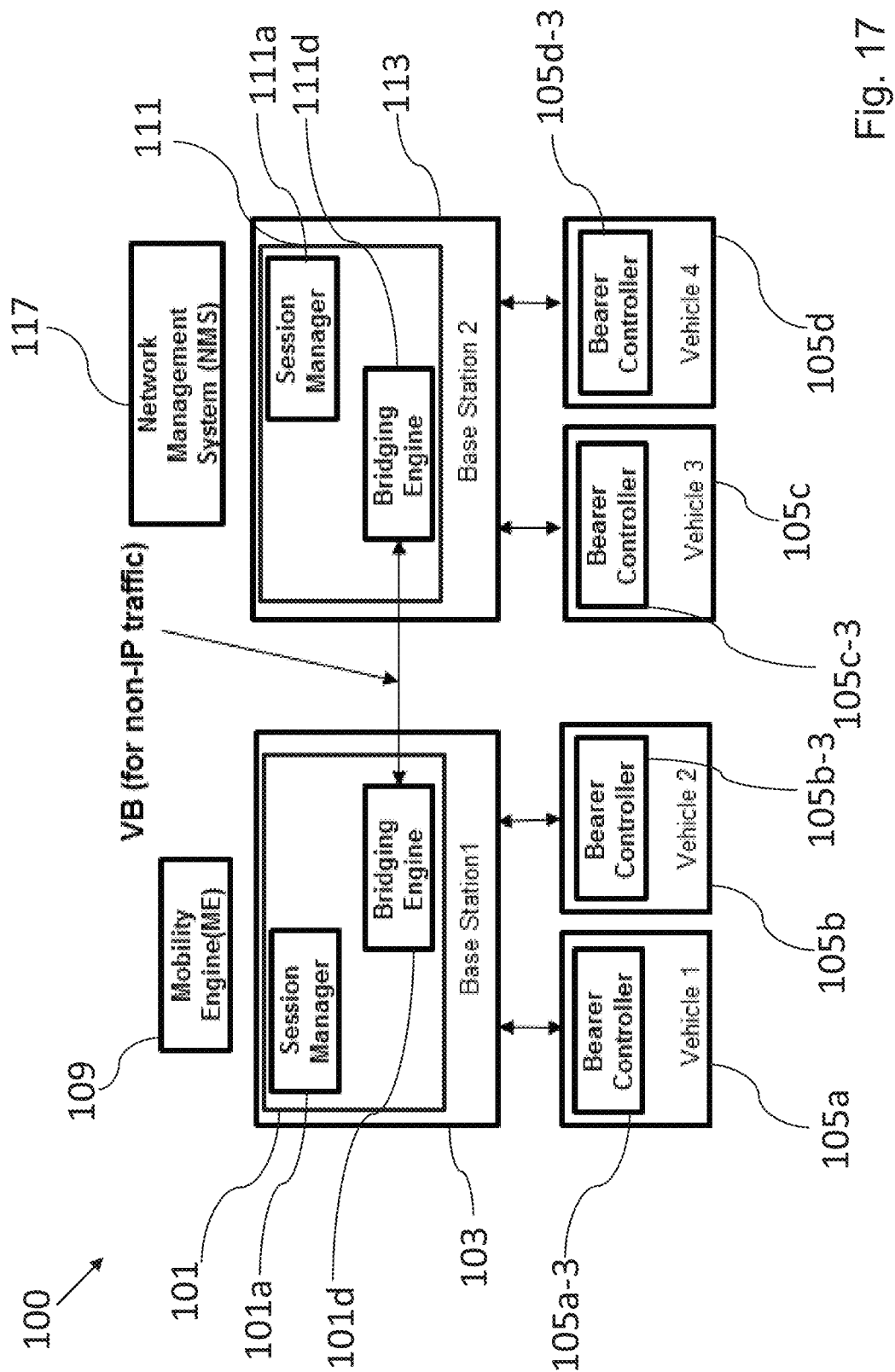
FIG. 17 shows a schematic diagram illustrating a wireless communication network including mobile communication devices according to an embodiment and network entities according to an embodiment.

FIG. 17 shows a schematic diagram illustrating a further embodiment of the communication network 100 including the mobile communication devices 105a, 105b, 105c, 105d according to an embodiment as well as the network entities 101, 111 according to an embodiment.

In this embodiment of the disclosure, generally the network entity 111 can be configured identically or similar to the network entity 101 described above. Moreover, as in the case of the network entity 101, the network entity 111 can be implemented as a collocated base station 113 (referred to as base station 2 in FIG. 17) or as a part thereof. More specifically, the network entity 111 comprises, similarly to the network entity 101 shown in FIG. 1, a session manager 111a configured to select a first geographical code from a plurality of geographical codes, wherein each geographical code is associated with a geographical region and wherein the first geographical code is associated with a first geographical region including or close to (i.e. in the vicinity of) a current geographical position of at least one of the plurality of mobile communication devices 105c, 105d, a MAC and/or PHY level encoder (for the purpose of clarity not shown in FIG. 17) configured to encode on a MAC and/or physical level at least a portion of a message intended for the at least one mobile communication device 105c, 105d using the first geographical code, and a communication interface (for the purpose of clarity not shown in FIG. 17) configured to send the message with the portion encoded with the first geographical code to the at least one mobile communication device 105c, 105d.

Moreover, in this embodiment, both the network entity 101 and the network entity 111 comprise a bridging engine 101d and 111d, respectively. In particular, the bridging engine (BE) 101d, 111d can be configured to forward messages between the neighboring base stations 103, 113 over a vehicular bridge (VB) link in multi-cell scenarios, wherein the vehicles of the same group can be connected to the base stations 103, 113. For example, this can happen in the following two cases: during an initial session establishment phase, wherein different mobile communication devices, e.g. vehicles, of the same group may be connected to different neighboring base stations 103, 113 and when group members may perform handovers from one base station 103 to another base station 113.

The forwarding rules between the neighboring BEs 101*d*, 111*d* can be configured in different ways. For example, in one case, a normal static forwarding rule can be considered, and in a second case a more dynamic forwarding rule can be considered. In the first case, the BE, e.g. 101*d*, forwards duplicate messages, wherein duplicate messages are copies of the original (not encoded) messages that are sent in the downlink from the current BS 103, to all other connected neighboring BEs, e.g. 111*d*. Moreover, different cases can be considered based on whether the communication session is a new session or an ongoing session when the mobile communication devices, e.g. vehicles, are connected to multiple BSs 103, 113.

Figure 18:
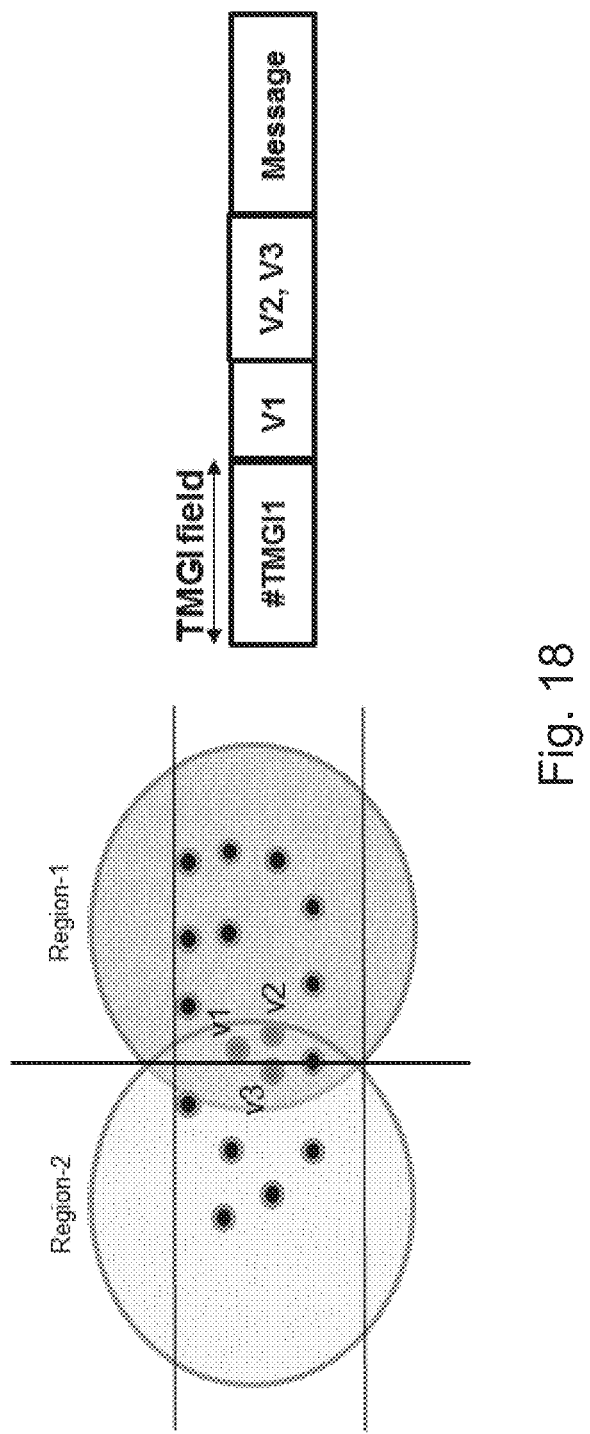
FIG. 18 shows a schematic diagram of an exemplary network topology and an exemplary service request message according to an embodiment.
Figure 19A:
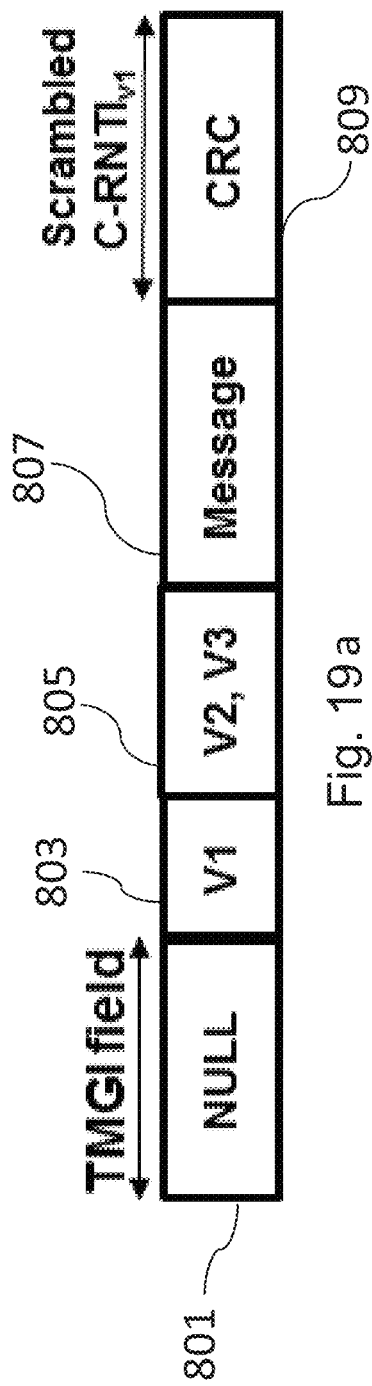
FIG. 19a shows a schematic diagram of an exemplary service request message before setting a TMGI value according to an embodiment.
Figure 19B:
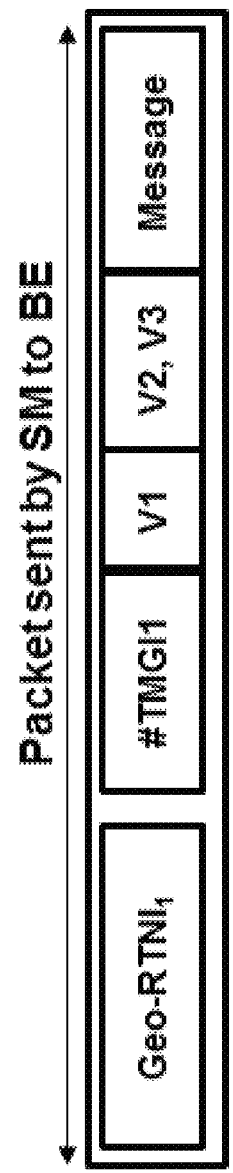
FIG. 19b shows a schematic diagram of an exemplary message comprising a Geo-RNTI value and a TMGI value according to an embodiment.

For example, FIG. 18 shows a schematic diagram of the serving BE 101*d* and the neighboring BE 111*d* in a multiple base station scenario according to an embodiment. In the embodiment shown in FIG. 18, the mobile communication device, i.e. vehicle v1, sends a service request (i.e., lane merge request) with TMGI field as NULL to its BS 103 as shown in FIG. 19*a*. The BE 101*d* (collocated with the BS 103) forwards the message to the SM 101*a* for the assignment of TMGI values (e.g., TMGI1) and Geo-RNTI values (e.g. Geo-RNTI1). Then, it can pass the information back to the SM 101*a* as shown in FIG. 19*b*. Afterwards, the BE 101*d* can distribute the message to other neighboring BEs, such as the BE 111*d* collocated with the BS 113, as shown in FIG. 20*a*. In this case, since it is a new session, the previous TMGI and previous BS ID can be set to NULL, since the neighboring BE 111*d* did not assign the TMGI for the new session yet. When the neighboring BE 111*d*, which is collocated with the BS 113, receives the message, it can check that this is a new service request and some vehicles in this session are connected to its collocated BS 113. Then, it can pass the message to the SM 111*a* for local TMGI values (e.g., TMGI2) and Geo-RNTI values (Geo-RNTI2) assignments. Once these values are assigned by the SM 111*a*, the message can be passed to BE 111*d* for downlink transmission.

Meanwhile the BE 111*d* can create the mapping between its local TMGI values (e.g., TMGI2) and the remote TMGI values (e.g. TMGI1). This mapping can be used for the follow-up messages, if any of its connected mobile communication devices, i.e. vehicles (e.g., v3), sends another multicast message which can be transmitted to v1 and v2 connected to BS1 103. Meanwhile, the neighboring BE 111*d* can also inform the serving BE 101*d* about this mapping so that it has also the same mapping as shown in FIG. 20*c*. Then, the BE 111*d* can pass the original message to the collocated BS 113 for transmission in the downlink.

Figure 21A:
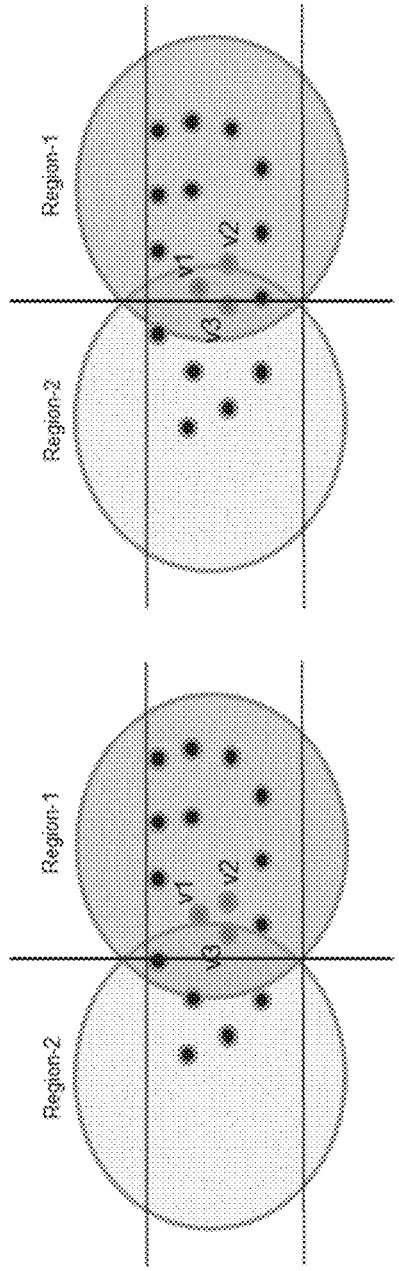
FIG. 21a shows a schematic diagram of an exemplary handover scenario between mobile communication devices according to an embodiment.

FIG. 21 shows a schematic diagram of an exemplary handover scenario between the mobile communication devices, e.g. vehicles, according to an embodiment.

In this embodiment, the session starts when the mobile communication devices, e.g. vehicles v1, v2 and v3, are attached to the BS1 103 and are using TMGI1 under BS1 103. Afterwards, the vehicle v3 can perform a handover and attach to the BS2 113. After the handover has taken place, the vehicle v3 can send a message to its new BS (BS1 103) for that session, wherein the message has the format shown in FIG. 21*b* (message field may be NULL or carry payload).

Figure 22A:
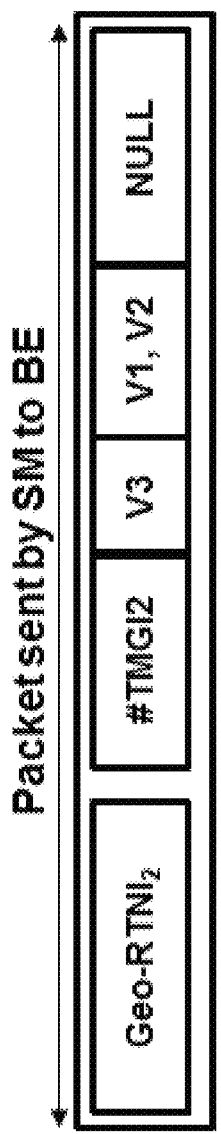
FIG. 22a shows a schematic diagram of an exemplary message with assigned TMGI values and Geo-RNTI values according to embodiments of the disclosure.

When the BE 101*d* receives the message, it can realize that the vehicle v3 has performed a handover from another BS 113, so that it can pass the message to the SM 101*a* that assigns a new TMGI (e.g., TMGI2) and Geo-RNTI (e.g., Geo-RNTI2). Finally, it can pass the message back to the BE 101*d* as shown in FIG. 22*a*.

Figure 22B:
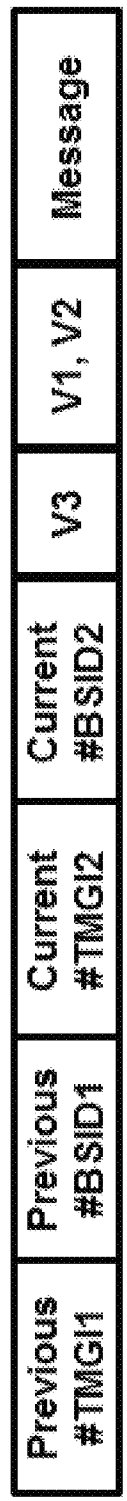
FIG. 22b shows a schematic diagram of an exemplary message sent from a first network entity to a second network entity in a communication network according to an embodiment.

The BE 101*d* can check whether the payload part of the message is null (but it may include payload as well), so that it may not send the message to the BS 103 for downlink transmission. It may only pass this information to the neighboring BE 111*d* for establishing a new forwarding path and send the message shown in FIG. 22*b*. Once the neighboring BE 111*d* receives the message, it can create the TMGI mapping table and perform transmission in the downlink (if the payload has some information content), since the message content matches the relevant TMGI (e.g., TMGI1) and base station ID (BSID) (e.g., BSID1) settings.

Figure 21B:
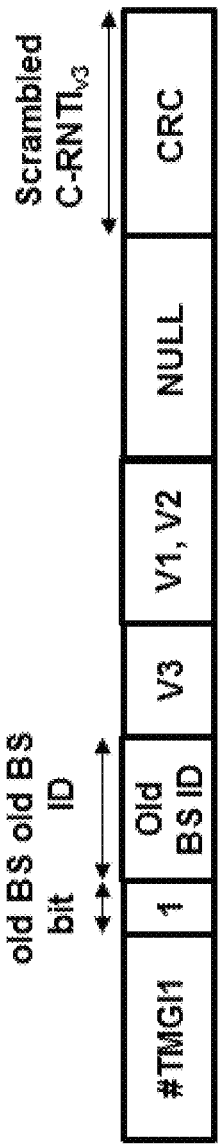
FIG. 21b shows a schematic diagram of an exemplary message scrambled with RNTI values according to an embodiment.
Figure 22C:
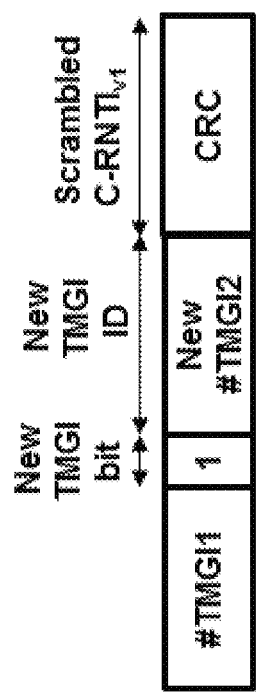
FIG. 22c shows a schematic diagram of an exemplary message comprising TMGI values according to an embodiment.

If there is already another mobile communication device, i.e. vehicle, in the new base station 103 together with the vehicle v3 that performed the handover, then the SM 101*a* can receive the message shown in FIG. 21*b*. Then, the SM 101*a* can send back the already assigned TMGI value to this new vehicle as unicast message in downlink as shown in FIG. 22*c*.

Moreover, dynamic forwarding rules (which means that the BE 101*d* forwards the message only to relevant neighboring BEs 111*d* (i.e., not all neighboring BEs)) can be also used when each relevant BE 101*d* builds a TMGI mapping with the relevant neighboring BE 111*d*.

Figure 23:
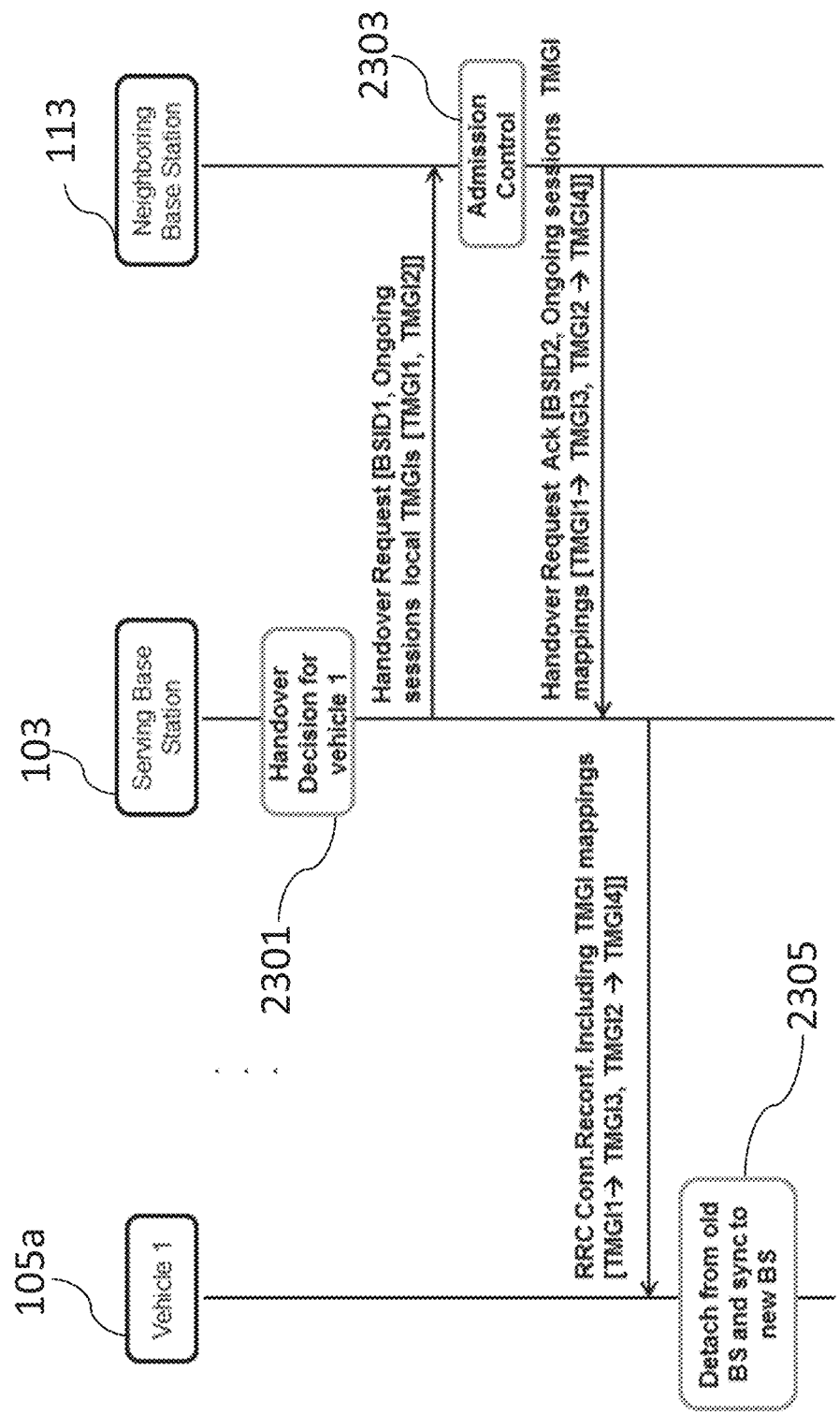
FIG. 23 shows a schematic diagram of a handover signaling of a mobile communication device according to an embodiment.

FIG. 23 shows a schematic diagram of a handover signaling for the mobile communication device 105*a* according to an embodiment.

The procedures explained above for handover scenarios do not consider any specific technology as baseline. Therefore, there is no dependence to any radio technology. However, in case some specific radio technologies (e.g. LTE) are considered, other embodiments of the disclosure take into account modifications of a handover related signaling of that specific technology. For example, in the case of LTE, intra E-UTRAN handovers scenario for intra-MME case can be considered (3GPP TS 36.300 V14.0.0 (2016-09) Evolved Universal Terrestrial Radio Access (E-UTRA) and Evolved Universal Terrestrial Radio Access Network (E-UTRAN); Overall description; Stage 2). In this case, the handover request signaling sent by the serving base station 103 (source eNB) can carry locally assigned TMGI values for a specific user. Then, when the neighboring base station 113 (target eNB) receives the handover request, it can create the handover request acknowledgement as shown in the figure. In this embodiment, this acknowledgement message can include the complete mapping information of all ongoing sessions of the mobile communication device, i.e. vehicle 105*a* that performs the handover. To this end, the SM 111*a* located in the neighboring BS 113 can check the locally assigned TMGI values and can perform a mapping with its local assignments. If the neighboring SM 111*a* has already an entry for the corresponding TMGI, it can just use that information. If it does not have any mapping information, it can also create a new TMGI value and map it to the TMGI that can be sent by the serving BS 103. Finally, all of this mapping information can be carried in a handover request acknowledgement from the neighboring BS 113 to the serving BS 103. This message can be sent by the serving BS 103 to the mobile communication device, i.e. vehicle 105*a*, as a radio resource control (RRC) message in order to perform the handover (3GPP TS 36.300 V14.0.0 (2016-09) Evolved Universal Terrestrial Radio Access (E-UTRA) and Evolved Universal Terrestrial Radio Access Network (E-UTRAN); Overall description; Stage 2). The RRC message sent to the mobile communication device, i.e. vehicle 105a can be already defined as a RRC connection reconfiguration message and this message can carry (together with already defined information contents for the mobile communication device, i.e. vehicle 105a) the TMGI mapping information for the mobile communication device, i.e. vehicle 105a. Once the mobile communication device, i.e. vehicle 105a receives this information, it can start to use the correct TMGI values for sending and receiving the data in the UL and DL respectively in the new BS 113 (see step 2305).

Figure 24:
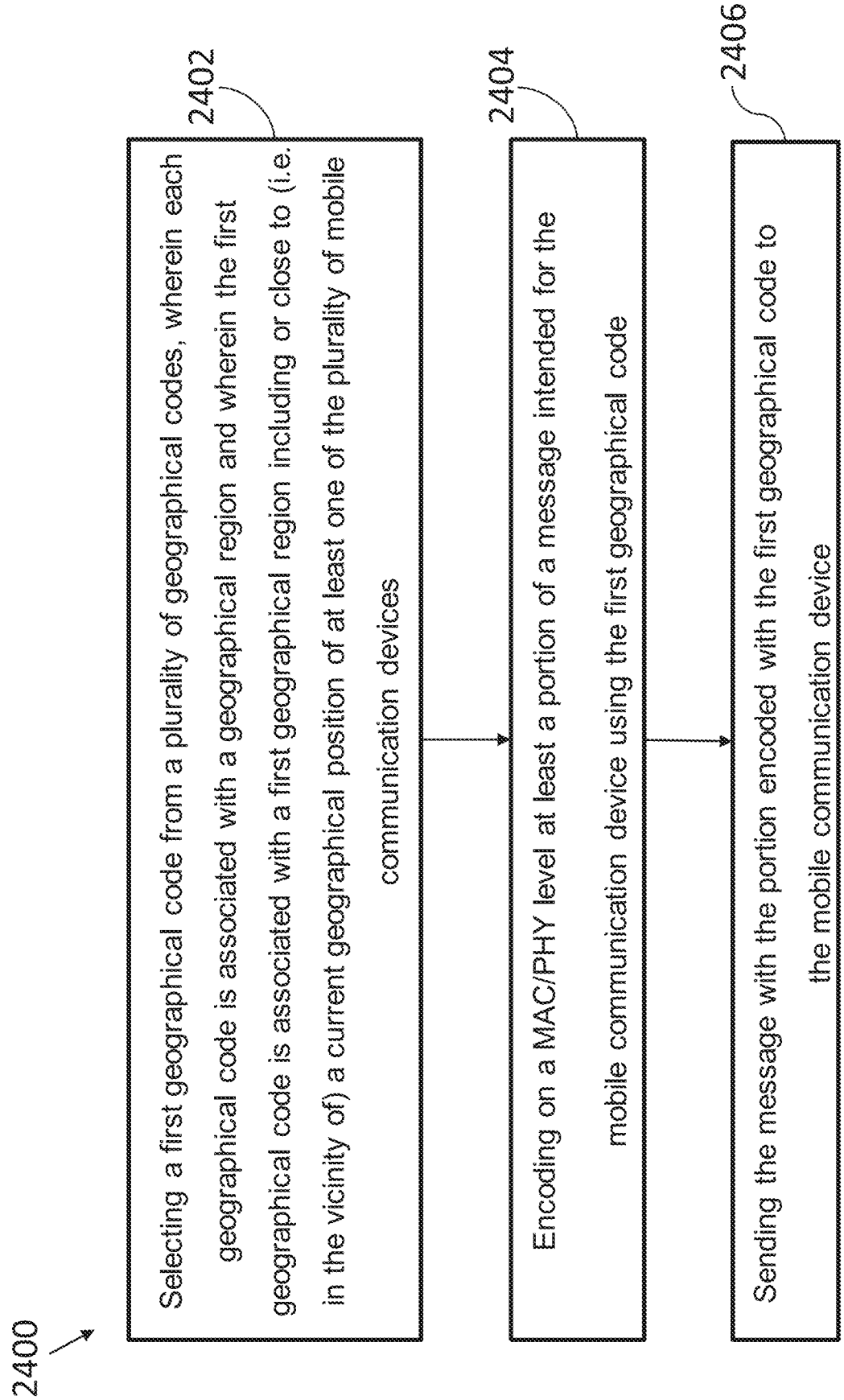
FIG. 24 shows a schematic diagram of a method for providing a plurality of communication services to a plurality of mobile communication devices according to an embodiment.

FIG. 24 shows a schematic diagram of a method 2400 for providing a plurality of communication services to the plurality of mobile communication devices 105a, 105b according to an embodiment.

The method 2400 comprises the steps of selecting 2402 a first geographical code from a plurality of geographical codes, wherein each geographical code is associated with a geographical region and wherein the first geographical code is associated with a first geographical region including or close to (i.e. in the vicinity of) a current geographical position of at least one of the plurality of mobile communication devices, encoding 2404 on a MAC and/or physical level at least a portion of a message intended for the at least one mobile communication device using the first geographical code, and sending 2406 the message with the portion encoded with the first geographical code to the at least one mobile communication device.

Figure 25:
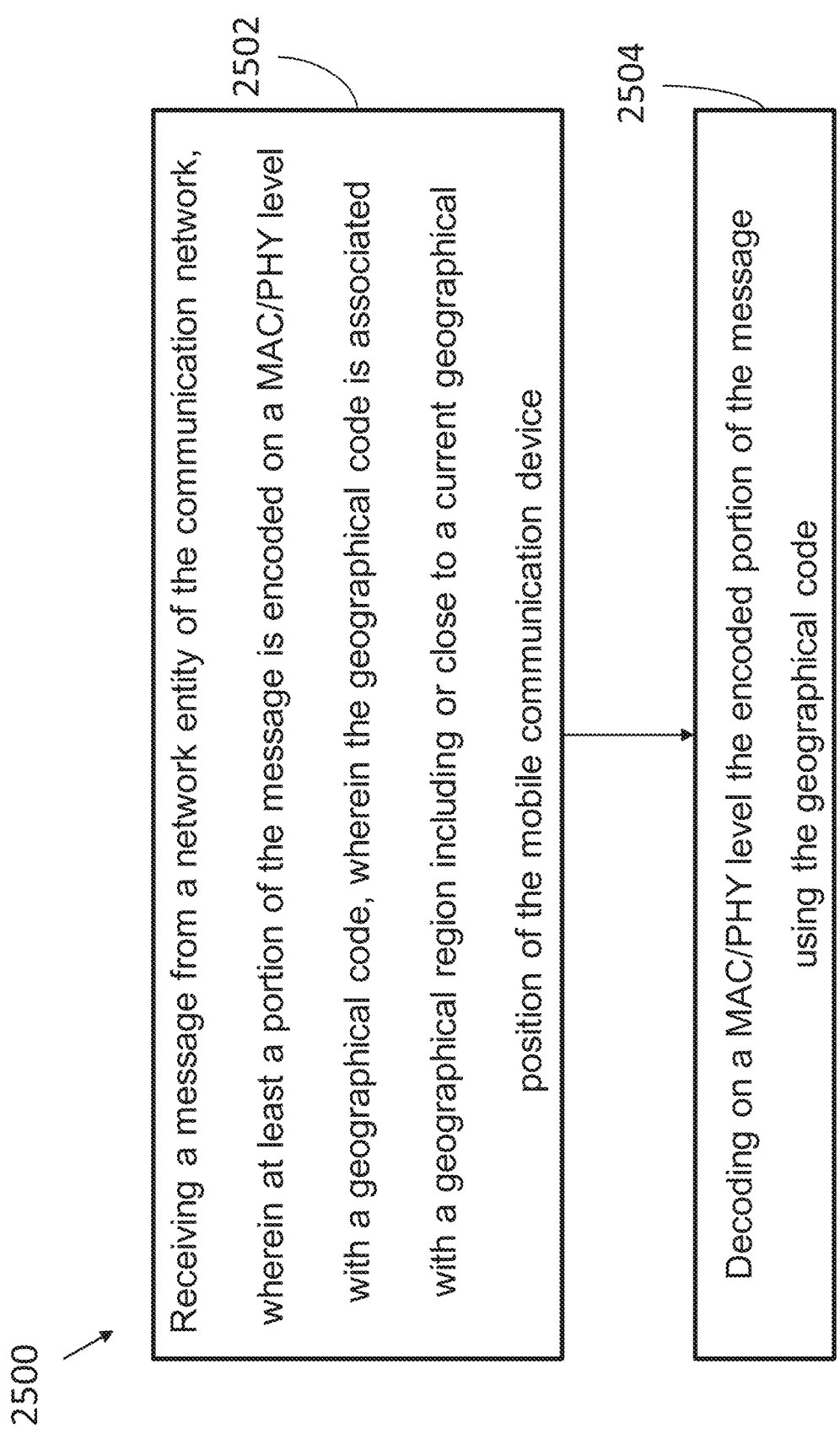
FIG. 25 shows a schematic diagram of a method of operating a mobile communication device according to an embodiment.

FIG. 25 shows a schematic diagram of a method 2500 of operating the mobile communication device 105a configured to use one or more of a plurality of communication services provided by the communication network 100.

The method 2500 comprises the steps of receiving 2502 a message from the network entity 101 of the communication network 100, wherein at least a portion of the message is encoded on a MAC and/or physical level with a first geographical code, wherein the first geographical code is associated with a geographical region including or close to a current geographical position of the mobile communication device 105a, and decoding 2504 on a MAC and/or physical level the encoded portion of the message using the first geographical code.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A network entity for a communication network, the network entity comprising:
    a memory storing a computer program comprising a program code; and
    computer hardware configured to execute the computer program to cause the network entity to:
        select a first geographical code from a plurality of geographical codes, wherein the first geographical code is associated with a first geographical region including a current geographical position of at least one mobile communication device of a plurality of mobile communication devices, wherein a mapping between the plurality of geographical codes and associated geographical regions is preconfigured in the network entity and the mapping between the plurality of geographical codes and associated geographical regions is preconfigured in the at least one mobile communication device in response to an initial attach procedure, a location update procedure, a handover procedure, or another service request message of the at least one mobile communication device, and wherein the first geographical code is a first geographical radio network temporary identifier (RNTI);
        encode, on at least one of a media access control (MAC) level or a physical (PHY) level, at least a portion of a message intended for the at least one mobile communication device based on the first geographical code;
        scramble at least a cyclic redundancy check (CRC) portion of the message based on the first geographical code for encoding, on at least one of the MAC level or the PHY level, at least a portion of the message intended for the at least one mobile communication device; and
        send the message with the portion encoded based on the first geographical code to the at least one mobile communication device.

2. The network entity of claim 1, wherein executing the computer program further causes the network entity to:
    select a second geographical code from the plurality of geographical codes, wherein the second geographical code is associated with a second geographical region including the current geographical position of the at least one mobile communication device, but different to the first geographical region associated with the first geographical code;
  encode, on at least one of the MAC level or the PHY level, at least a portion of the message intended for the at least one mobile communication device based on the second geographical code; and
  send the message with the portion encoded based on the second geographical code to the at least one mobile communication device.

3. The network entity of claim 1, wherein executing the computer program further causes the network entity to:
  send to the at least one mobile communication device a subset of the plurality of geographical codes, wherein the subset of the plurality of geographical codes is selected based on information about a future trajectory of the at least one mobile communication device.

4. The network entity of claim 1, wherein the communication network comprises a plurality of communication cells, wherein each communication cell of the plurality of communication cells is associated with a base station of the communication network, and wherein the first geographical region is defined by a portion of a communication cell of the plurality of communication cells.

5. The network entity of claim 1, wherein the at least one mobile communication device comprises a first group of mobile communication devices, and wherein executing the computer program further causes the network entity to:
  include a first group identifier comprising a temporary mobile group identity in the message with the portion encoded based on the first geographical code, wherein the first group identifier is assigned to at least one of the first group of mobile communication devices or a communication service associated with the first group of mobile communication devices.

6. The network entity of claim 5, wherein executing the computer program further causes the network entity to:
  maintain a mapping between the plurality of geographical codes and a plurality of group identifiers, including the first group identifier; and
  select the first group identifier based on the first geographical code and the mapping between the plurality of geographical codes and the plurality of group identifiers.

7. The network entity of claim 1, wherein the network entity is implemented as a base station or as a part of a base station.

8. The network entity of claim 7, wherein executing the computer program further causes the network entity to:
  send the message to at least one neighboring network entity implemented as a neighboring base station or as a part of a neighboring base station.

9. The network entity of claim 1, wherein executing the computer program further causes the network entity to:
  receive a message from a mobile communication device, wherein at least a portion of the message is encoded on at least one of the MAC level or the PHY level with a further geographical code, wherein the further geographical code is associated with a geographical region including a current geographical position of the at least one mobile communication device; and
  decode, on at least one of the MAC level or the PHY level, at least a portion of the message based on the further geographical code.

10. A method of operating a network entity for a communication network, the method comprising:
  selecting a first geographical code from a plurality of geographical codes, wherein each geographical code of the plurality of geographical codes is associated with a geographical region, and wherein the first geographical code is associated with a first geographical region including a current geographical position of at least one mobile communication device of a plurality of mobile communication devices, wherein a mapping between the plurality of geographical codes and associated geographical regions is preconfigured in the network entity and the mapping between the plurality of geographical codes and associated geographical regions is preconfigured in the at least one mobile communication device in response to an initial attach procedure, a location update procedure, a handover procedure, or another service request message of the at least one mobile communication device, and wherein the first geographical code is a first geographical radio network temporary identifier (RNTI);
  encoding, on at least one of a media access control (MAC) level or a physical (PHY) level, at least a portion of a message intended for the at least one mobile communication device the first geographical code;
  scramble at least a cyclic redundancy check (CRC) portion of the message based on the first geographical code for encoding, on at least one of the MAC level or the PHY level, at least a portion of the message intended for the at least one mobile communication device; and
  sending the message with the portion encoded based on the first geographical code to the at least one mobile communication device.

11. A mobile communication device configured to use one or more of a plurality of communication services provided by a communication network, the mobile communication device comprising:
  a communication interface configured to receive a message from a network entity of the communication network on at least one of a media access control (MAC) level or a physical (PHY) level, wherein at least a portion of the message is encoded based on a first geographical code, wherein the first geographical code is associated with a geographical region including a current geographical position of the mobile communication device, wherein a mapping between the first geographical code and the geographical region is preconfigured in the network entity and the mapping between the first geographical code and the geographical region is preconfigured in the mobile communication device in response to an initial attach procedure, a location update procedure, a handover procedure, or another service request message of the mobile communication device, and wherein the first geographical code is a first geographical radio network temporary identifier (RNTI); and
  a processor configured to:
    decode, on at least one of the MAC level or the PHY level, the portion of the message encoded based on the first geographical code; and
    descramble at least a cyclic redundancy check (CRC) portion of the message based on the first geographical code for decoding the portion of the message encoded based on the first geographical code.

12. The mobile communication device of claim 11, wherein the processor is further configured to:
  select a further geographical code from a plurality of geographical codes, wherein each geographical code of the plurality of geographical codes is associated with a geographical region and wherein the further geographical code is associated with a geographical region including the current geographical position of the mobile communication device, wherein a mapping between the plurality of geographical codes and associated geographical regions is preconfigured in the network entity and the mapping between the plurality of geographical codes and associated geographical regions is preconfigured in the mobile communication device in response to the initial attach procedure, the location update procedure, the handover procedure, or the other service request message of the mobile communication device, and encode at least a portion of a message intended for the network entity based on the further geographical code, and wherein the communication interface is configured to send the message with the portion encoded based on the further geographical code to the network entity.

13. A method of operating a mobile communication device configured to use one or more of a plurality of communication services provided by a communication network, the method comprising:

receiving a message from a network entity of the communication network on at least one of a media access control (MAC) level or a physical (PHY) level, wherein at least a portion of the message is encoded based on a first geographical code, wherein the first geographical code is associated with a geographical region including a current geographical position of the mobile communication device, wherein a mapping between the first geographical code and the geographical region is preconfigured in the network entity and the mapping between the first geographical code and the geographical region is preconfigured in the mobile communication device in response to an initial attachment procedure, a location update procedure, a handover procedure, or another service request message of the mobile communication device, and wherein the first geographical code is a first geographical radio network temporary identifier (RNTI);

decoding, on at least one of the MAC level or the PHY level, the portion of the message encoded based on the first geographical code; and descrambling at least a cyclic redundancy check (CRC) portion of the message based on the first geographical code for decoding the portion of the message encoded based on the first geographical code.

* * * * *